United States Patent
Yang et al.

(10) Patent No.: US 7,795,366 B2
(45) Date of Patent: Sep. 14, 2010

(54) MODIFIED POLYETHYLENE COMPOSITIONS

(75) Inventors: Henry W. Yang, Houston, TX (US); Bryan R. Chapman, Annandale, NJ (US); David J. Lohse, Bridgewater, NJ (US); Bruce R. Lundmark, Waller, TX (US); Anthony Poloso, Praireville, LA (US); Sandra D. Schregenberger, Hillsborough, NJ (US); Manika Varma-Nair, Warren, NJ (US); Wen Li, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 799 days.

(21) Appl. No.: 11/333,421

(22) Filed: Jan. 17, 2006

(65) Prior Publication Data

US 2006/0173123 A1 Aug. 3, 2006

Related U.S. Application Data

(63) Continuation-in-part of application No. 10/782,306, filed on Feb. 19, 2004, now Pat. No. 7,271,209, which is a continuation-in-part of application No. 10/640,435, filed on Aug. 12, 2003, application No. 11/333,421, which is a continuation-in-part of application No. 10/634,351, filed on Aug. 4, 2003, which is a continuation-in-part of application No. 10/782,228, filed on Feb. 19, 2004, now Pat. No. 7,531,594.

(60) Provisional application No. 60/402,665, filed on Aug. 12, 2002, provisional application No. 60/649,266, filed on Feb. 2, 2005.

(51) Int. Cl.
*C08F 110/06* (2006.01)
*C08F 110/02* (2006.01)
*C08F 10/04* (2006.01)
*C08F 2/00* (2006.01)

(52) U.S. Cl. .............. 526/348; 526/351; 526/352; 526/348.6; 526/89

(58) Field of Classification Search ............... 526/348, 526/351, 352, 348.6, 89
See application file for complete search history.

(56) References Cited

U.S. PATENT DOCUMENTS 3,201,364 A 8/1965 Salyer
(Continued)

FOREIGN PATENT DOCUMENTS

DE 1 769 723 2/1972
(Continued)

OTHER PUBLICATIONS

Additives Which Modify Physical Properties, Plastics, J. Stepek, H. Daoust, Springer Verlag, New York, 1983, p. 6-69.
(Continued)

*Primary Examiner*—William K Cheung
(74) *Attorney, Agent, or Firm*—Catherine L. Bell

(57) ABSTRACT

The present invention relates to a composition comprising more than 25 weight % (based on the weight of the composition) of one or more ethylene polymers having an $M_w$ of 20,000 g/mole or more and at least 0.1 weight % of a liquid hydrocarbon modifier where the modifier has:
 1) a viscosity index of 120 or more, and
 2) an kinematic viscosity of 3 to 3000 cSt at 100° C., and
 3) a pour point of −10° C. or less, and
 4) a flash point of 200° C. or more;
and wherein the modifier contains less than 5 weight % of functional groups selected from hydroxide, aryls, substituted aryls, halogens, alkoxys, carboxylates, esters, acrylates, oxygen, nitrogen, and carboxyl, based upon the weight of the modifier.

75 Claims, 2 Drawing Sheets

U.S. PATENT DOCUMENTS

| | | | |
|---|---|---|---|
| 3,415,925 A | 12/1968 | Marans | |
| 3,445,394 A * | 5/1969 | Hunt | 524/87 |
| 4,073,782 A | 2/1978 | Kishi et al. | |
| 4,110,185 A | 8/1978 | Williams et al. | |
| 4,132,698 A | 1/1979 | Gessler et al. | |
| 4,210,570 A | 7/1980 | Trotter et al. | |
| 4,536,537 A | 8/1985 | Klingensmith et al. | |
| 4,774,277 A | 9/1988 | Janac et al. | |
| 4,960,820 A | 10/1990 | Hwo | |
| 5,162,436 A | 11/1992 | Davis et al. | |
| 5,494,962 A | 2/1996 | Gauthy et al. | |
| 5,728,754 A | 3/1998 | Lakshmanan et al. | |
| 5,741,848 A * | 4/1998 | Nogata et al. | 524/587 |
| 5,869,555 A | 2/1999 | Simmons et al. | |
| 6,177,190 B1 | 1/2001 | Gehlsen et al. | |
| 6,383,634 B1 | 5/2002 | Kornfeldt et al. | |
| 6,515,231 B1 | 2/2003 | Strobech et al. | |
| 7,153,571 B2 | 12/2006 | Allermann | |
| 7,271,209 B2 | 9/2007 | Li et al. | |
| 7,319,077 B2 | 1/2008 | Mehta et al. | |
| 7,413,784 B2 | 8/2008 | Ouhadi | |
| 7,476,710 B2 | 1/2009 | Mehta et al. | |
| 2001/0056159 A1 | 12/2001 | Jeong et al. | |
| 2003/0181575 A1 | 9/2003 | Schmidt et al. | |
| 2004/0054040 A1 | 3/2004 | Lin et al. | |
| 2004/0091631 A1 | 5/2004 | Belli et al. | |
| 2004/0106723 A1 | 6/2004 | Yang et al. | |
| 2004/0186214 A1 * | 9/2004 | Li et al. | 524/474 |
| 2004/0260001 A1 | 12/2004 | Lin et al. | |
| 2005/0148720 A1 | 7/2005 | Li et al. | |
| 2006/0008643 A1 | 1/2006 | Lin et al. | |
| 2006/0178483 A1 | 8/2006 | Mehta et al. | |
| 2006/0189744 A1 | 8/2006 | Tse et al. | |
| 2006/0189763 A1 | 8/2006 | Yang et al. | |
| 2006/0205863 A1 | 9/2006 | Lin et al. | |
| 2006/0247331 A1 | 11/2006 | Coffey et al. | |
| 2006/0247332 A1 | 11/2006 | Coffey et al. | |
| 2007/0021560 A1 | 1/2007 | Tse et al. | |
| 2007/0021561 A1 | 1/2007 | Tse et al. | |
| 2007/0021566 A1 | 1/2007 | Tse et al. | |
| 2007/0100053 A1 | 5/2007 | Chapman et al. | |
| 2007/0167553 A1 | 7/2007 | Westwood et al. | |
| 2008/0045638 A1 | 2/2008 | Chapman et al. | |
| 2008/0070994 A1 | 3/2008 | Li et al. | |
| 2008/0188600 A1 | 8/2008 | Westwood et al. | |
| 2008/0221274 A1 | 9/2008 | Jourdain | |
| 2008/0268272 A1 | 10/2008 | Jourdain | |
| 2008/0317990 A1 | 12/2008 | Runyan et al. | |
| 2009/0043049 A1 | 2/2009 | Chapman et al. | |

FOREIGN PATENT DOCUMENTS

| | | |
|---|---|---|
| EP | 0 046 536 | 1/1985 |
| EP | 300 689 | 1/1987 |
| EP | 344 014 | 11/1989 |
| EP | 404 011 | 12/1990 |
| EP | 407 098 | 1/1991 |
| EP | 448 259 | 9/1991 |
| EP | 755 970 | 1/1997 |
| EP | 757 076 | 2/1997 |
| EP | 1 028 145 | 8/2000 |
| EP | 1 342 249 | 1/2009 |
| FR | 2 094 870 | 3/1972 |
| GB | 1329915 | 9/1973 |
| JP | 56-095938 | 8/1981 |
| JP | 69 029554 | 8/1983 |
| JP | 012 82280 | 11/1989 |
| JP | 07-292167 | 11/1995 |
| WO | WO 98/44041 | 10/1998 |
| WO | WO 01/18109 | 3/2001 |
| WO | WO 02/31044 | 4/2002 |
| WO | WO 2004/014997 | 2/2004 |
| WO | WO 2004/014998 | 2/2004 |
| WO | WO 2006/083540 | 8/2006 |
| WO | WO 2007/048422 | 5/2007 |

OTHER PUBLICATIONS

Chemical Additives for the Plastics Industry, Plasticizers, Radian Corp., 1987, p. 107-116.

Rubber Technology Handbook, Werner Hoffman, Hanser Publishers, New York, 1989, p. 294-305.

Synthetic Lubricants and High-Performance Functional Fluids, 2nd Edition, Marcel Dekker, Inc. NewYork, 1999, pp. 3-52.

Jens Stehr, Investigation of the Effects of Poly($\alpha$-olefin) Plasticizers on the Properties of Elastomers, KGK, Jan./Feb. 2007, pp. 14-19 (translated from German by McElroy Translation Company.

* cited by examiner

MODIFIED POLYETHYLENE COMPOSITIONS

PRIORITY CLAIM

This invention claims the benefit of provisional application U.S. Ser. No. 60/649,266, filed Feb. 2, 2005, which is incorporated by reference herein. The present application is also a continuation in part of U.S. Ser. No. 10/782,306, filed Feb. 19, 2004 (now U.S. Pat. No. 7,271,209) which is a continuation in part of U.S. Ser. No. 10/640,435, filed on Aug. 12, 2003, which claims the benefit of and priority to U.S. Ser. No. 60/402,665, filed Aug. 12, 2002. The present application is also a continuation in part of U.S. Ser. No. 10/634,351, filed on Aug. 4, 2003, which claims the benefit of and priority to U.S. Ser. No. 60/402,665, filed Aug. 12, 2002. The present invention is also a continuation in part of Ser. No. 10/782,228, filed Feb. 19, 2004 (now U.S. Pat. No. 7,531,594).

FIELD OF THE INVENTION

The present invention relates to polyethylene compositions comprising an ethylene based polymer and a modifier, typically a liquid modifier. More particularly, the present invention relates to polyethylene compositions having improved properties such as flexibility, softness, clarity, tear resistance, low temperature impact resistance, and or processibility, without substantial loss in melting point or other properties while maintaining the molecular weight of the ethylene polymer.

BACKGROUND OF THE INVENTION

For many polyolefin applications, including films and fibers, flexibility and softness combined with retention of properties at high end-use temperatures are desirable attributes. In other polyolefin applications, including those that involve injection molding and rotomolding fabrication techniques, toughness is a critical attribute, particularly low temperature toughness and impact resistance. A low melt viscosity (high melt flow rate) is advantageous for almost all polyolefin fabrication processes, because this reduces cycle time or allows for lower temperature and/or energy requirements.

For polyethylene-type resins, the most common approach to improving flexibility and toughness is to lower the crystallinity (and therefore the density) by addition of comonomer. However, this typically also results in reduced melting points. Traditional approaches to achieve low melt viscosity are lowering the molecular weight and broadening the molecular weight distribution of the resin. However, both approaches can have detrimental effects on the final physical properties of the polyolefin article, such as lower puncture resistance or lower impact resistance. What is needed is a method to improve physical properties, such as flexibility and toughness, while simultaneously lowering melt viscosity. It would also be further advantageous in a fabrication environment be able to continuously vary these parameters to match changing needs, instead of choosing between discrete polyethylene types sold by density, melt index, and composition.

Addition of a plasticizer or other amorphous substance to a polyolefin is one way to attempt to address these needs. Some patent disclosures directed to such an end are U.S. Pat. Nos. 4,960,820; 4,132,698; 3,201,364; WO 02/31044; WO 01/18109 A1; and EP 0 300 689 A2. These disclosures are directed to polyolefins and elastomers blended with materials such as mineral oils which contain aromatic and/or other functional groups. Typically, addition of mineral oil also lowers the melt viscosity because the mineral oil itself has a viscosity well below that of the polyolefin.

Addition of compounds like mineral oils tend to improve the flexibility of a polyolefin, which identifies such compounds as "plasticizers" under the commonly accepted definition; that is, a substance that improves the flexibility, workability, or distensibility of a plastic or elastomer. Mineral oils are also often used as extenders, as well as for other purposes, in polyolefins. However, use of these additive compounds typically does not preserve the optical properties (e.g., color and or transparency) of the polyolefin, among other things. The melting point of the polyolefin is also typically not preserved, which reduces the softening point and upper use temperature of the composition. In addition, such additive compounds often have high pour points (greater than −20° C., or even greater than −10° C.), which results in little or no improvement in low temperature toughness of the polyolefin.

To improve the low temperature characteristics, it is customary to choose lower molecular weight, amorphous compounds as plasticizers. Low molecular weight compounds are also chosen for their low viscosity, which typically translates into lower melt viscosity and improved processibility of the polyolefin composition. Unfortunately, this choice often leads to other problems. For example, all or some of the additive can migrate to a surface and evaporate at an unacceptably high rate, which results in deterioration of properties over time. If the flash point is sufficiently low (e.g., less than 200° C.), the compound can cause smoking and be lost to the atmosphere during melt processing. It can also leach out of the polyolefin and impair food, clothing, and other articles that are in contact with the final article made from the plasticized polyolefin. It can also cause problems with tackiness or other surface properties of the final article. What is needed is a compound which imparts superior low temperature properties while also exhibiting low migration, leaching, and/or evaporation behaviors.

Another shortcoming of typical additive compounds is that they often contain a high (greater than 5 wt %) degree of fuinctionality due to carbon unsaturation and/or heteroatoms, which tends to make them reactive, thermally unstable, and/or incompatible with polyolefins, among other things. Mineral oils, in particular, consist of thousands of different compounds, many of which are undesirable for use in polyolefins due to molecular weight or chemical composition. Under moderate to high temperatures these compounds can volatilize and oxidize, even with the addition of oxidation inhibitors. They can also lead to problems during melt processing and fabrication steps, including degradation of molecular weight, cross-linking, or discoloration.

These attributes of typical additive compounds like mineral oils limit the performance of the final plasticized polyolefin, and therefore its usefulness in many applications. As a result, they are not highly desirable for use as modifiers for polyolefins. What is needed is a modifier that does not suffer from these deficiencies. Further, the modifier should improve the flexibility and toughness of the polyolefin, while maintaining its melting point. Ideally, the modifier has a low pour point, while still of sufficient molecular weight to avoid unacceptable exudation and extraction. It should also not contribute to deterioration of optical properties, surface properties, thermal stability, and or oxidative stability, and the like.

It would be particularly desirable to modify polyolefins such as polyethylene by using a simple, non-functionalized compound such as a paraffin. However, it has been disclosed that aliphatic or paraffinic compounds would impair the properties of polyolefins, and was thus not recommended. (See, e.g., CHEMICAL ADDITIVES FOR PLASTICS INDUSTRY 107-116 (Radian Corp., Noyes Data Corporation, NJ 1987); WO 01/18109 A1).

Other examples of polyolefins combined with plasticizers include: WO 2004/014998 which discloses blends of propylene based polymers with various non-functionalized plasticizers; WO 98/44041 which discloses plastic based sheet like material for a structure, especially a floor covering, which contains in a blend a plastic matrix comprising a chlorine free polyolefin or mixture of polyolefins and a plasticizer characterized in that the plasticizer is an oligomeric polyalphaolefin type substance; and U.S. Pat. No. 4,536,537 which discloses blends of LLDPE (UC 7047), polypropylene (7522) and Synfluid 2CS, 4CS, or 6CS having a viscosity of 40 to 6.5 cSt at 100° F./38° C., however the Synfluid 4CS and 6CS are reported to "not work" (col 3, ln 12).

Other background references of interest include EP 0 448 259 A, EP 1 028 145 A, U.S. Pat. Nos. 4,073,782, 3,415,925, 5,869,555, 4,210,570, 4,110,185, GB 1,329,915, U.S. Pat. Nos. 3,201,364, 4,774,277, JP 01282280, FR 2094870, JP 69029554, *Rubber Technology Handbook*, Werner Hoffman, Hanser Publishers, New York, 1989, pg 294-305, and *Additives for Plastics*, J. Stepek, H. Daoust, Springer Verlag, N.Y., 1983, pg-6-69.

Certain mineral oils have been classified as Hydrocarbon Basestock Group I, II, or III by the American Petroleum Institute (API) according to the amount of saturates and sulfur they contain and their viscosity indices. Group I basestocks are solvent-refined mineral oils that contain the highest levels of unsaturates and sulfur, and low viscosity indices; they tend to define the bottom tier of lubricant performance. They are the least expensive to produce and currently account for the bulk of the "conventional" basestocks. Groups II and III basestocks are more highly refined (e.g., by hydroprocessing) than Group I basestocks, and often perform better in lubricant applications. Group II and III basestocks contain less unsaturates and sulfur than the Group I basestocks, while Group III basestocks have higher viscosity indices than the Group II basestocks do. Additional API basestock classifications, namely Groups IV and V, are also used in the basestock industry. Rudnick and Shubkin in *Synthetic Lubricants and High-Performance Functional Fluids*, Second edition (Marcel Dekker, Inc. New York, 1999) describe the five basestock Groups as typically being:

Group I—mineral oils refined using solvent extraction of aromatics, solvent dewaxing, hydrofining to reduce sulfur content to produce mineral oils with sulfur levels greater than 0.03 weight %, saturates levels of 60 to 80 weight % and a Viscosity Index (VI) of about 90;

Group II—mildly hydrocracked mineral oils with conventional solvent extraction of aromatics, solvent dewaxing, and more severe hydrofining to reduce sulfur levels to less than or equal to 0.03 weight % as well as removing double bonds from some of the olefinic and aromatic compounds, saturate levels are greater than 95-98 weight% and VI is about 80-120;

Group III—severely hydrotreated mineral oils with saturates levels of some oils virtually 100%, sulfur contents are less than or equal to 0.03 weight % (preferably between 0.001 and 0.01 weight %) and VI is in excess of 120;

Group IV—"polyalphaolefins," which are hydrocarbon liquids manufactured by the catalytic oligomerization of linear alpha-olefins having 6 or more carbon atoms; in practice, however, this Group is generally thought of as synthetic basestock fluids produced by oligomerizing alpha-olefins have 4 or more carbons; and Group V—esters, polyethers, polyalkylene glycols, and includes all other basestocks not included in Groups I, II, III, and IV.

Prior attempts of adding mineral oils to polyethylenes to modify properties involve for the most part addition of Group I and Group II mineral oils. Even in cases where the mineral oil is not identified by an API Group classification, such as the case for so-called "process oils," "technical white oils," "food grade oils," etc., such mineral oils are still readily categorized into two classes based on Viscosity Index alone: those with VI less than 120 (similar to Group I and Group II mineral oils), and those with VI of 120 or greater. Certain aspects of the present invention ideally pertain to substances with a VI of 120 or greater, which excludes Group I and Group II mineral oils and any other mineral oils with VI<120.

We have discovered that certain hydrocarbon modifiers (preferably certain liquids), preferably comprising branched paraffins, will advantageously plasticize polyethylene to improve physical properties of polyethylene and reduce its melt viscosity, without compromising melting point and resin molecular weight, and without suffering from the deficiencies typically obtained with mineral oils. Moreover, addition of these liquid hydrocarbon modifiers provides a means to change such properties on a continuous scale, based on real-time needs, which is typically not possible due to the availability of only discrete polyethylene grades. Furthermore, a different set of relationships between physical and thermal attributes is obtained, compared to those available from traditional polyethylenes of different densities and composition, which allows for new and advantageous properties of the fabricated articles.

SUMMARY OF THE INVENTION

This invention relates to polyethylene compositions comprising one or more ethylene polymers and one or more modifiers, preferably liquid modifiers.

This invention further relates to a composition comprising more than 25 weight % (based on the weight of the composition) of one or more ethylene polymers having an $M_w$ of 20,000 g/mole or more and at least 0.1 weight % of a liquid hydrocarbon modifier where the modifier has: 1) a viscosity index of 120 or more, and 2) a kinematic viscosity of 3 to 3000 cSt at 100° C., 3) a pour point of −10° C. or less, and 4) a flash point of 200° C. or more, and 5) a specific gravity (15.6° C.) of less than 0.86; and wherein the modifier contains less than 5 weight % of functional groups selected from hydroxide, aryls, substituted aryls, halogens, alkoxys, carboxylates, esters, acrylates, oxygen, nitrogen, and carboxyl, based upon the weight of the modifier.

Specifically, this invention relates to polyethylene compositions comprising one or more ethylene polymers and one or more modifiers where the modifier is a polyalphaolefin comprising oligomers or polymers of $C_5$ to $C_{14}$ olefins, wherein any individual liquid modifier or the combination of liquid modifiers has a Viscosity Index of 120 or more, and preferably has a kinematic viscosity of 3 to 3000 cSt at 100° C., and preferably has a pour point less than −20° C.

This invention also relates to polyethylene compositions comprising polyethylene and one or more liquid modifiers where the liquid modifier comprises oligomers or polymers of $C_5$ to $C_{14}$ olefins, and where an individual modifier or the combination of modifiers has a Viscosity Index of 120 or more, provided that when the plasticized composition comprises 18 to 25 weight % linear low density polyethylene (having a density of 0.912 to 0.935 g/cc and or melt index of 16 dg/min or less) and comprises between 4 and 10 weight % of polyalphaolefin that is a hydrogenated, highly branched dimer of an alpha olefin having 8-12 carbon atoms, the composition does not comprise 78 to 65 weight % of propylene homopolymer.

This invention also relates to polyethylene compositions comprising polyethylene and one or more liquid modifiers where the liquid modifier comprises a Group III basestock composition having a number average molecular weight of 300 to 3,000 g/mole.

This invention also relates to polyethylene compositions comprising polyethylene and one or more liquid modifiers where the liquid modifier comprises $C_{20}$ to $C_{1500}$ paraffins, more preferably $C_{30}$ to $C_{400}$ paraffins, more preferably $C_{40}$ to $C_{250}$ paraffins including linear paraffins and branched paraffins. Preferably such paraffins have a kinematic viscosity of about 6 to 300 cSt at 100° C.

This invention also relates to polyethylene compositions comprising polyethylene and one or more liquid modifiers where the liquid modifier comprises linear and/or branched paraffinic hydrocarbon compositions produced by one or more gas-to-liquids processes having a number average molecular weight of 300 to 10,000 g/mole.

This invention also relates to polyethylene compositions comprising polyethylene and one or more liquid modifiers where the liquid modifier comprises linear and/or branched paraffinic hydrocarbon compositions with a pour point of −10° C. or less, preferably −15° C. or less, more preferably −25° C. or less, preferably −30° C. or less; and number average molecular weight of 300 g/mole or more, preferably 500 g/mole or more.

DEFINITIONS

Figure 1:
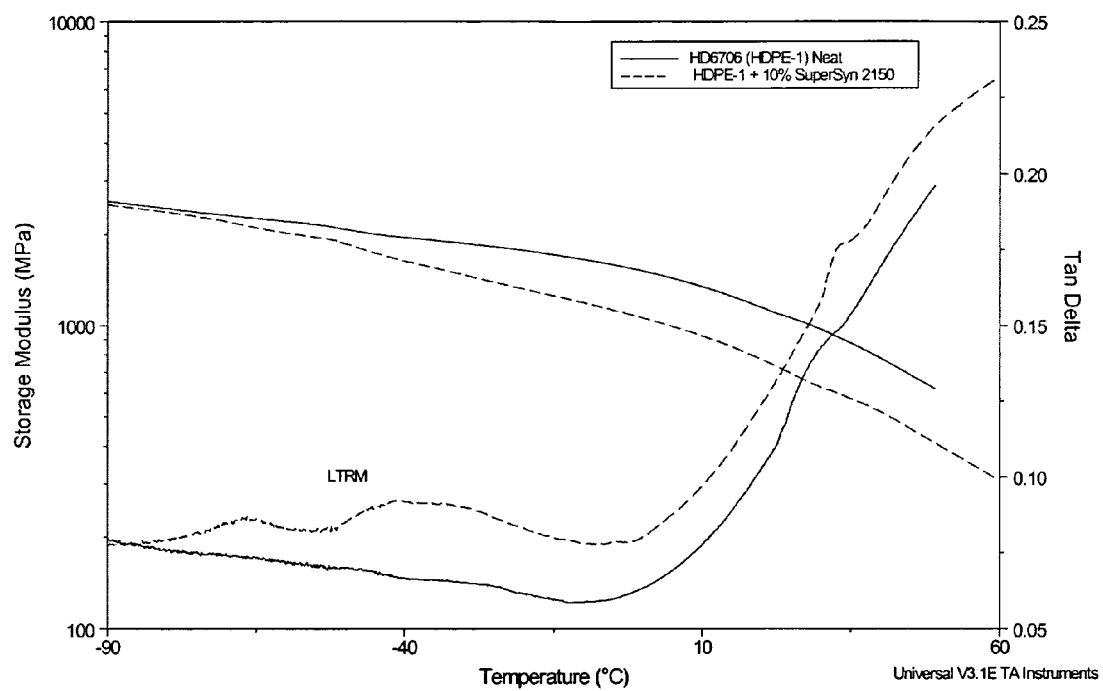
FIG. 1 is a plot of DMTA results for high density polyethylene modified with a polyalphaolefin, specifically for HDPE-1, neat and modified with 10% SuperSyn 2150 (now sold as ExxonMobil SpectraSyn Ultra 150).

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more chemically distinct monomers types. Thus, as used herein, the terms "polyethylene," "ethylene polymer," and "ethylene based polymer" mean a polymer or copolymer comprising at least 50 mole % ethylene units (preferably at least 70 mole % ethylene units, more preferably at least 80 mole % ethylene units, even more preferably at least 90 mole % ethylene units, even more preferably at least 95 mole % ethylene units or 100 mole % ethylene units); and having less than 20 mole % propylene units (preferably less than 15 mole %, preferably less than 10 mole %, preferably less than 5 mole %, preferably 0 mole % propylene units), which precludes an ethylene copolymer from being an EP Rubber as defined below. Furthermore, the term "polyethylene composition" means a blend containing one or more polyethylene components.

For purposes of this invention an "oligomer" is defined to have a number-average molecular weight ($M_n$) of 10,000 g/mole or less as measured using the methods specified under Fluid Properties in the Test Methods section below.

For purposes of this invention and the claims thereto, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene (LDPE) (LDPE includes linear low density polyethylene "LLDPE" which refers to ethylene polymers in this density range made using a heterogeneous catalyst, as well as ethylene polymers in this density range made in a high pressure process using a free radical catalyst); and an ethylene polymer having a density of more than 0.940 g/cm³ is referred to as a high density polyethylene (HDPE). For these definitions, density is determined using the method described under Test Methods below.

For purposes of this invention and the claims thereto an "EP Rubber" is defined to be a copolymer of ethylene and propylene, and optionally diene monomer(s), chemically crosslinked (i.e., cured) or not, where the ethylene content is from 35 to 80 weight %, the diene content is 0 to 15 weight %, and the balance is propylene; and where the copolymer has a Mooney viscosity, ML(1+4)@ 125° C. (measured according to ASTM D1646) of 15 to 100. For purposes of this invention and the claims thereto an "EPDM" or "EPDM Rubber" is defined to be an EP Rubber having diene present.

For the purposes of this invention a "liquid" is defined to be a fluid that has no distinct melting point above 0° C., preferably no distinct melting point above −20° C.; and has a kinematic viscosity at 100° C. of 3000 cSt or less, preferably 1000 cSt or less and/or a kinematic viscosity at 40° C. of 35,000 cSt or less, preferably 10,000 cSt or less.

For purposes of this invention and the claims thereto the term $C_4$ olefin(s) includes all isomers, such as 1-butene, 2-butene, isobutylene, and mixtures thereof.

For purposes of this invention and the claims thereto Group I, II, and III basestocks are defined to be mineral oils having the following properties:

|  | Saturates (wt %) | Sulfur (wt %) | Viscosity Index |
|---|---|---|---|
| Group I | <90 &/or | >0.03% & | ≧80 & <120 |
| Group II | ≧90 & | ≦0.03% & | ≧80 & <120 |
| Group III | ≧90 & | ≦0.03% & | ≧120 |

Wt % saturates, wt % sulfur, and Viscosity Index are measured following ASTM D2007, ASTM D2622, and ASTM D2270, respectively.

For purposes of this invention and the claims thereto Group IV basestocks are defined to be "polyalphaolefins," which are hydrocarbon liquids manufactured by the catalytic oligomerization or polymerization of linear alpha-olefins having 5 or more carbon atoms, preferably 6 or more carbon atoms, preferably 8 or more carbon atoms. The polyalphaolefins may be characterized by any degree of tacticity, including isotacticity or syndiotacticity, and/or may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

For purposes of the present invention and description herein, the term "paraffin" includes all isomers such as n-paraffins, branched paraffins, isoparaffins, cycloparaffins, and may include cyclic aliphatic species, and blends thereof, and may be derived synthetically by means known in the art, or from refined crude oil in such a way as to meet the requirements described for desirable modifiers described herein. By isoparaffin is meant that the paraffin chains possess $C_1$ to $C_{18}$ alkyl branching along at least a portion of each paraffin chain; and more particularly, isoparaffins are saturated aliphatic hydrocarbons whose molecules have at least one carbon atom bonded to at least three other carbon atoms or at least one side chain (i.e., a molecule having one or more tertiary or quaternary carbon atoms). Isoparaffins may also include cycloparaffins with branched side chains, generally as a minor component of the isoparaffin. Isoparaffins with multiple alkyl branches may include any combination of regio and stereo placement of those branches.

For purposes of the present invention and the claims thereto, the term "mineral oil" includes any petroleum-based oil; derived from petroleum crude oil that has been subjected to refining steps (such as distillation, solvent processing, hydroprocessing, and/or dewaxing) to achieve the final oil. This also includes petroleum-based oils that are extensively purified and/or modified through severe processing treatments. For purposes of this invention and the claims thereto synthetic oils are those oils that have been manufactured by combining monomer units using catalysts and/or heat.

For purposes of this invention and the claims thereto the amount of modifier in a given composition is determined by the approach described below under Test Methods.

For purposes of this invention and the claims thereto when melting point is referred to and there is a range of melting temperatures, the melting point is defined to be the peak melting temperature from a differential scanning calorimetry (DSC) trace as described below under Test Methods, and when there is more than one melting peak, it refers to the peak melting temperature for the largest peak among principal and secondary melting peaks, as opposed to the peak occurring at the highest temperature, thereby reflecting the largest contribution to the calorimetric response of the material.

DETAILED DESCRIPTION OF THE INVENTION

This invention relates to polyethylene compositions comprising one or more ethylene polymers and one or more modifiers, preferably liquid modifier(s).

Composition

Typically, the ethylene polymer(s) are present in the compositions of the present invention at 25 weight % (wt %) or more, preferably at 40 wt % or more, and from 50 to 99.9 wt % in another embodiment, and from 60 to 99 wt % in yet another embodiment, and from 70 to 98 wt % in yet another embodiment, and from 80 to 97 wt % in yet another embodiment, and from 90 to 99 wt % in yet another embodiment, wherein a desirable range may be any combination of any upper wt % limit with any lower wt % limit described herein and the wt % is based on the weight of the composition.

In another embodiment the ethylene polymer(s) is present at 50 to 99.99 wt %, alternately 60 to 99 wt %, alternately 70 to 98 wt %, alternately 80 to 97 wt %, alternately 90 to 96 wt %, and the modifier is present at 50 to 0.01 wt %, alternately 40 to 1 wt %, alternately 30 to 2 wt %, alternately 20 to 3 wt %, alternately 10 to 4 wt %, based upon the weight of the ethylene polymer(s) and the modifier(s).

In another embodiment the modifier(s) are present in the compositions of the present invention at 0.1 wt % or more, preferably at 1 wt % or more, and from 60 to 0.1 wt % in another embodiment, and from 50 to 0.5 wt % in another embodiment, and from 40 to 1 wt % in yet another embodiment, and from 30 to 3 wt % in yet another embodiment, and from 20 to 2 wt % in yet another embodiment, and from 10 to 0.1 wt % in yet another embodiment, wherein a desirable range may be any combination of any upper wt % limit with any lower wt % limit described herein and the wt % is based on the weight of the composition. In another embodiment the modifier is present at more than 3 weight %, based upon the weight of the ethylene polymer(s) and the modifier.

Preferred compositions of the present invention can be characterized in that the weight of the modified composition decreases less than 3%, preferably less than 2%, preferably less than 1% when plasticizer permanence is determined by ASTM D1203 (0.25 mm thick sheet, 300 hours in dry 70° C. oven). Weight loss here refers to the reduction in weight in excess of that measured for the unmodified polyethylene under the same test conditions.

In another embodiment, the polyethylene/modifier compositions of this invention comprise less than 50 wt % (preferably less than 40 wt %, preferably less than 30 wt %, preferably less than 20 wt %, preferably less than 10 wt %, more preferably less than 5 wt %, more preferably less than 1 wt %) of propylene homopolymer or copolymer, based upon the weight of the composition, where a propylene homopolymer or copolymer is a polymer comprising at least 50 mole % propylene monomer units.

In another embodiment, the polyethylene/modifier compositions of this invention comprise less than 50 wt % (preferably less than 40 wt %, preferably less than 30 wt %, preferably less than 20 wt %, preferably less than 10 wt %, more preferably less than 5 wt %, more preferably less than 1 wt %) of EP Rubber, based upon the total weight of the composition.

In another embodiment, the ethylene polymer(s) comprises 0% diene. In another embodiment the total diene content of all ethylene polymers present in the composition is 0%. In another embodiment the ethylene polymer(s) comprise less than 30 weight % diene, preferably less than 20 wt %, preferably less than 10 wt %, preferably less than 5 weight % diene, preferably less than 2.5 weight %, preferably less than 1 weight % (based upon the weight of the ethylene polymer) and preferably has a density greater than 0.86 g/cm$^3$, preferably greater than 0.87 g/cm$^3$.

In another embodiment the polyethylene/modifier compositions comprise less than 50 weight % of ethylene elastomer(s), preferably less than 40 wt %, preferably less than 30 wt %, preferably less than 20 wt %, preferably less than 10 wt %, more preferably less than 5 wt %, more preferably less than 1 wt %, based upon the weight of the composition.

In another embodiment, the polyethylene/modifier compositions may further comprise a copolymer or co-oligomer of ethylene and one or more alpha-olefin(s), such as those disclosed in U.S. Pat. No. 6,639,020.

In another embodiment, the polyethylene/modifier compositions of this invention comprise less than 20 weight %, preferably less than 10 weight %, preferably less than 1 weight %, of a liquid homopolymer or copolymer of isoprene and or butadiene having a kinematic viscosity at 40° C. of 10,000 cSt or less, based upon the weight of the composition. In another embodiment, the polyethylene/modifier compositions of this invention comprise less than 20 weight %, preferably less than 10 weight %, preferably less than 1 weight %, of a liquid homopolymer or copolymer of isoprene and or butadiene having a kinematic viscosity at 40° C. between 2,000 cSt and 20 cSt.

Modifiers

The polyethylene compositions of the present invention include a modifier, preferably a liquid modifier (also simply referred to as a "modifier" hereafter). It will be realized that the classes of materials described herein that are useful as modifiers can be utilized alone or admixed with other modifiers described herein in order to obtain desired properties.

In one embodiment, the modifier of the present invention is a compound comprising carbon and hydrogen, and does not contain an appreciable extent of functional groups selected from hydroxide, aryls and substituted aryls, halogens, alkoxys, carboxylates, esters, acrylates, oxygen, nitrogen, and carboxyl. By "appreciable extent of functional groups", it is meant that these groups and compounds comprising these groups are not deliberately added to the modifier, and if present at all, are present at less than 5 weight % (wt %) in one embodiment, more preferably less than 4 wt %, more preferably less than 3 wt %, more preferably less than 2 wt %, more preferably less than 1 wt %, more preferably less than 0.7 wt %, more preferably less than 0.5 wt %, more preferably less than 0.3 wt %, more preferably less than 0.1 wt %, more preferably less than 0.05 wt %, more preferably less than 0.01 wt %, more preferably less than 0.001 wt %, where wt % is based upon the weight of the modifier.

In another embodiment, the modifier is a hydrocarbon that does not contain olefinic unsaturation to an appreciable extent. By "appreciable extent of olefinic unsaturation" it is meant that the carbons involved in olefinic bonds account for less than 10%, preferably less than 9%, more preferably less than 8%, more preferably less than 7%, more preferably less than 6%, more preferably less than 5%, more preferably less than 4%, more preferably less than 3%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%, of the total number of carbons. In some embodiments, the percent of carbons of the modifier involved in olefinic bonds is between 0.001 and 10% of the total number of carbon atoms in the modifier, preferably between 0.01 and 7%, preferably between 0.1 and 5%, more preferably less than 1%. Percent of carbons involved in olefinic bonds is determined by the method described under Test Methods below.

In one embodiment, the modifier of the present invention comprises $C_{25}$ to $C_{1500}$ paraffins, and $C_{30}$ to $C_{500}$ paraffins in another embodiment. In another embodiment, the modifier consists essentially of $C_{35}$ to $C_{300}$ paraffins, and consists essentially of $C_{40}$ to $C_{250}$ paraffins in another embodiment.

In one embodiment, the modifier of the present invention has a pour point (ASTM D97) of less than −10° C. in one embodiment, less than −20° C. in another embodiment, less than −30° C. in yet another embodiment, less than −40° C. in yet another embodiment, less than −50° C. in yet another embodiment, and less than −60° C. in yet another embodiment, and greater than −120° C. in yet another embodiment, and greater than −200° C. in yet another embodiment, wherein a desirable range may include any upper pour point limit with any lower pour point limit described herein.

In another embodiment any modifier described herein may have a Viscosity Index (VI) as measured by ASTM D2270 of 90 or more, preferably 95 or more, more preferably 100 or more, more preferably 105 or more, more preferably 110 or more, more preferably 115 or more, more preferably 120 or more, more preferably 125 or more, more preferably 130 or more. In another embodiment the modifier has a VI between 90 and 400, preferably between 120 and 350.

In some embodiments, the modifier may have a kinematic viscosity at 100° C. (ASTM D445) of from 3 to 3000 cSt, and from 6 to 300 cSt in another embodiment, and from 6 to 200 cSt in another embodiment, and from 8 to 100 cSt in yet another embodiment, and from 4 to 50 cSt in yet another embodiment, and less than 50 cSt in yet another embodiment, and less than 25 cSt in yet another embodiment, wherein a desirable range may comprise any upper viscosity limit with any lower viscosity limit described herein.

In another embodiment any modifier described herein may have a flash point (ASTM D92) of 200° C. or more, preferably 210° or more, preferably 220° C. or more, preferably 230° C. or more, preferably 240° C. or more, preferably 245° C. or more, preferably 250° C. or more, preferably 260° C. or more, preferably 270° C. or more, preferably 280° C. or more. In another embodiment the modifier has a flash point between 200° C. and 300° C., preferably between 240° C. and 290° C.

Any modifier described herein may have a dielectric constant measured at 20° C. of less than 3.0 in one embodiment, and less than 2.8 in another embodiment, less than 2.5 in another embodiment, and less than 2.3 in yet another embodiment, and less than 2.1 in yet another embodiment. Polyethylene itself has a dielectric constant (1 kHz, 23° C.) of at least 2.3 according to the CRC HANDBOOK OF CHEMISTRY AND PHYSICS (David R. Lide, ed. $82^d$ ed. CRC Press 2001).

In some embodiments any modifier described herein may have a specific gravity (ASTM D4052, 15.6/15.6° C.) of less than 0.88 in one embodiment, and less than 0.87 in another embodiment, and less than 0.86 in another embodiment, and less than 0.85 in another embodiment, and from 0.80 to 0.87 in another embodiment, and from 0.81 to 0.86 in another embodiment, and from 0.82 to 0.85 in another embodiment, wherein a desirable range may comprise any upper specific gravity limit with any lower specific gravity limit described herein.

In a preferred embodiment, the modifier has a specific gravity (15.6/15.6° C.) of 0.85 or less (preferably between 0.80 and 0.85) and a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or a carbon number of at least 20.

In another preferred embodiment, the modifier has a specific gravity (15.6/15.6° C.) of 0.86 or less (preferably between 0.81 and 0.86, preferably between 0.82 and 0.855) and a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or a carbon number of at least 30.

In another preferred embodiment, the modifier has a specific gravity (15.6/15.6° C.) of 0.87 or less (preferably between 0.82 and 0.87) and a kinematic viscosity at 100° C. of 10 cSt or more (preferably 12 cSt or more, preferably 14 cSt or more, preferably 16 cSt or more, preferably 20 cSt or more, preferably 30 cSt or more, preferably 40 cSt or more) and/or a carbon number of at least 50.

In yet another preferred embodiment, the modifier has a specific gravity (15.6/15.6° C.) of 0.88 or less (preferably 0.87 or less, preferably between 0.82 and 0.87) and a kinematic viscosity at 100° C. of 15 cSt or more (preferably 20 cSt or more, preferably 25 cSt or more, preferably 30 cSt or more, preferably 40 cSt or more) and/or a carbon number of at least 60.

In other embodiments any modifier described herein may have an initial boiling point (ASTM D1160) of from 300° C. to 600° C. in one embodiment, and from 350° C. to 500° C. in another embodiment, and greater than 400° C. in yet another embodiment.

In other embodiments any modifier described herein may have a low degree of color, such as typically identified as "water white", "prime white", "standard white", or "bright and clear," preferably an APHA color of 100 or less, preferably 80 or less, preferably 60 or less, preferably 40 or less, preferably 20 or less, as determined by ASTM D1209.

The modifier preferably has a number average molecular weight ($M_n$) of 21,000 g/mole or less in one embodiment, preferably 20,000 g/mole or less, preferably 19,000 g/mole or less, preferably 18,000 g/mole or less, preferably 16,000 g/mole or less, preferably 15,000 g/mole or less, preferably 13,000 g/mole or less and 10,000 g/mole or less in yet another embodiment, and 5,000 g/mole or less in yet another embodiment, and 3,000 g/mole or less in yet another embodiment, and 2,000 g/mole or less in yet another embodiment, and 1500 g/mole or less in yet another embodiment, and 1,000 g/mole or less in yet another embodiment, and 900 g/mole or less in yet another embodiment, and 800 g/mole or less in yet another embodiment, and 700 g/mole or less in yet another embodiment, and 600 g/mole or less in yet another embodiment, and 500 g/mole or less in yet another embodiment. Preferred minimum $M_n$ is at least 200 g/mole, preferably at least 300 g/mole. Further a desirable molecular weight range can be any combination of any upper molecular weight limit with any lower molecular weight limit described above. $M_n$ is determined according to the methods specified under Fluid Properties in the Test Methods section below.

In a preferred embodiment of the present invention, addition of the modifier lowers the flexural modulus of the polyethylene composition without substantially lowering the melting point; specifically, the flexural modulus (measured by ASTM D790A) is reduced by 10% or more while the melting point (measured by DSC) is lowered by 1° C. or less for every 10 weight % of modifier added, preferably 15% or more, preferably 20% or more, as compared to the same composition without the modifier present.

In another embodiment the polyethylene/modifier compositions described herein have at −40° C. a 0.05 (or greater) increase in the Tan Delta for every 10 weight % of modifier added to the composition, as compared to the same composition without the modifier present, preferably a 0.10 increase or greater.

Any of the modifiers may also be described by any number of, or any combination of, parameters described herein.

In a preferred embodiment the modifiers described herein have a kinematic viscosity at 100° C. of 3 to 3000 cSt, preferably 6 to 300 cSt, more preferably 8 to 100 cSt; and/or a number average molecular weight ($M_n$) of 300 to 21,000 g/mole, preferably 500 to 5,000 g/mole, more preferably 600 to 3,000 g/mole; and/or a carbon number of 20 to 1500, preferably 35 to 400, more preferably 40 to 250.

In another preferred embodiment the modifiers described herein have a kinematic viscosity at 100° C. of 3 to 500 cSt, preferably 6 to 200 cSt, more preferably 8 to 100 cSt, more preferably 3 to 25 cSt; and/or a number average molecular weight ($M_n$) of 300 to 10,000 g/mole, preferably 400 to 5,000 g/mole, more preferably 500 to 2,500 g/mole, more preferably 300 to 1,200 g/mole; and/or a carbon number of 25 to 500, preferably 30 to 400, more preferably 40 to 200, more preferably 20 to 100.

In another preferred embodiment the modifiers described herein have a kinematic viscosity at 100° C. of 3 to 100 cSt, preferably 4 to 50 cSt, more preferably 6 to 25 cSt, more preferably 3 to 15 cSt; and/or a number average molecular weight ($M_n$) of 300 to 3,000 g/mole, preferably 350 to 2,000 g/mole, more preferably 400 to 1,000 g/mole, more preferably 300 to 800 g/mole; and/or a carbon number of 20 to 200, preferably 25 to 150, more preferably 30 to 100, more preferably 20 to 70.

In a preferred embodiment, the modifier has a pour point of −25° C. or less, preferably between −30° C. and −90° C., and a kinematic viscosity in the range of from 20 to 5000 cSt at 40° C. In another preferred embodiment, the modifier has a pour point of −25° C. or less and a number-average molecular weight of 400 g/mole or greater. Most mineral oils, which typically include functional groups, have a pour point of from 10° C. to −25° C. at the same viscosity and molecular weight ranges.

In another preferred embodiment the modifier has kinematic viscosity at 100° C. of 3 cSt or greater, preferably 6 cSt or greater, more preferably 8 cSt or greater, and one or more of the following properties:
1. a pour point of −10° C. or less, preferably −20° C. or less, preferably −30° C. or less, preferably −40° C. or less; and/or,
2. a Viscosity Index of 120 or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less as determined by ASTM D1209; and/or
4. a flash point of 200° C. or more, preferably 220° C. or more, preferably 240° C. or more; and/or
5. a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the modifier has a Viscosity Index of 120 or more and one or more of the following properties:

1. a pour point of −10° C. or less, preferably −20° C. or less, preferably −30° C. or less, preferably −40° C. or less; and/or,
2. a kinematic viscosity at 100° C. of 3 cSt or greater, preferably 6 cSt or greater, preferably 8 cSt or greater, preferably 10 cSt or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less, as determined by ASTM D1209; and/or
4. a flash point of 200° C. or more, preferably 220° C. or more, preferably 240° C. or more; and/or
5. a specific gravity (15.6° C.) of less than 0.86.

Most mineral oils have a Viscosity Index of less than 120.

In another preferred embodiment, the modifier has a pour point of −20° C. or less, preferably −30° C. or less, and one or more of the following properties:
1. a kinematic viscosity at 100° C. of 3 cSt or greater, preferably 6 cSt or greater, preferably 8 cSt or greater, preferably 10 cSt or more; and/or,
2. a Viscosity Index of 120 or greater, preferably 130 or greater; and/or,
3. a low degree of color, such as typically identified as "water white", "prime white", "standard white", or "bright and clear," preferably APHA color of 100 or less, preferably 80 or less, preferably 60 or less, preferably 40 or less, preferably 20 or less, preferably 15 or less as determined by ASTM D1209
4. a flash point of 200° C. or more, preferably 220° C. or more, preferably 240° C. or more; and/or
5. a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

Characteristics of some commercially available mineral oils marketed as process oils in polymers are listed in Table 1a below.

TABLE 1a

Commercial Examples of Mineral Oils

| Grade | KV @ 100° C., cSt | VI | Pour Point, ° C. | Specific gravity | Flash Point, ° C. | APHA Color |
|---|---|---|---|---|---|---|
| Drakeol 34[1] | 9 | 99 | −12 | 0.872 | 254 | 10 |
| Paralux 1001R[2] | 4 | 99 | −17 | 0.849 | 212 | 25 |
| Paralux 2401R[2] | 6 | 101 | −12 | 0.863 | 234 | 45 |
| Paralux 6001R[2] | 12 | 102 | −21 | 0.871 | 274 | 45 |
| Sunpar 120[3] | 6 | 106 | −15 | 0.872 | 228 | >200 |
| Sunpar 150[3] | 11 | 97 | −9 | 0.881 | 245 | >300 |
| Sunpar 2280[3] | 31 | 95 | −9 | 0.899 | 305 | >300 |
| Plastol 135[4] | 5 | 104 | −9 | 0.865 | 210 | 10 |
| Plastol 537[4] | 11 | 97 | −3 | 0.880 | 240 | 10 |
| Plastol 2105[4] | 30 | 110 | −15 | 0.885 | 270 | 10 |
| Flexon 843[4] | 5 | 91 | −12 | 0.869 | 218 | >250 |
| Flexon 865[4] | 11 | 93 | −3 | 0.879 | 252 | >250 |
| Flexon 815[4] | 32 | 101 | −9 | 0.895 | 310 | >300 |
| Shellflex 210[5] | 4 | 95 | −18 | 0.860 | 216 | >200 |
| Shellflex 330[5] | 9 | 95 | −10 | 0.875 | 256 | >250 |
| Shellflex 810[5] | 33 | 95 | −9 | 0.896 | 324 | >300 |

[1]Available commercially from Penreco.
[2]Available commercially from ChevronTexaco.
[3]Available commercially from Sunoco.
[4]Available commercially from ExxonMobil.
[5]Available commercially from Shell.

In another preferred embodiment the modifier has a glass transition temperature ($T_g$) that cannot be determined by ASTM E1356 or, if it can be determined, then the $T_g$ according to ASTM E1356 is less than 0° C., preferably less than −10° C., more preferably less than −20° C., more preferably less than −30° C., more preferably less than −40° C., and, preferably, also has one or more of the following properties:
1. an initial boiling point as determined by ASTM D1160 greater than 300° C., preferably greater than 350° C., preferably greater than 400° C.; and/or
2. a pour point of −10° C. or less, preferably −15° C. or less, preferably −25° C. or less, preferably −35° C. or less, preferably −45° C. or less; and/or
3. a specific gravity (ASTM D4052, 15.6/15.6° C.) of less than 0.88, preferably less than 0.86, preferably less than 0.84, preferably from 0.80 to 0.88, preferably from 0.82 to 0.86; and/or
4. a final boiling point as determined by ASTM D1160 of from 300° C. to 800° C., preferably from 400° C. to 700° C., preferably greater than 500° C.; and/or
5. a weight average molecular weight (Me) between 30,000 and 400 g/mole preferably between 15,000 and 500 g/mole, more preferably between 5,000 and 600 g/mole; and/or
6. a number average molecular weight ($M_n$) between 10,000 and 400 g/mole, preferably between 5,000 and 500 g/mole, more preferably between 2,000 and 600 g/mole; and/or
7. a flash point as measured by ASTM D92 of 200° C. or greater, and/or
8. a dielectric constant at 20° C. of less than 3.0, preferably less than 2.8, preferably less than 2.5, preferably less than 2.3, preferably less than 2.2; and/or
9. a carbon number of from 25 to 800, preferably 30 to 500, preferably 35 to 300.

Molecular weight and carbon number are determined using the methods described in the Test Methods section below.

This invention also relates to polyethylene compositions comprising one or more ethylene polymers and one or more modifiers where the modifier comprises a polyalphaolefin (PAO) comprising oligomers or polymers of $C_5$ to $C_{14}$ olefins having a kinematic viscosity at 100° C. of 3 cSt or more, preferably 6 cSt or more, preferably of 8 cSt or more, and a Viscosity Index of 120 or more, preferably 130 or more. Preferably a combination of modifiers is used were the combination has a kinematic viscosity at 100° C. of 3 cSt or more, preferably 6 cSt or more, preferably of 8 cSt or more, and a Viscosity Index of 120 or more, preferably 130 or more.

This invention also relates to polyethylene compositions comprising one or more ethylene copolymers and one or more modifiers where the modifier comprises oligomers or polymers of $C_6$ to $C_{14}$ olefins having a Viscosity Index of 120 or more, provided that when the polyethylene composition comprises between 4 and 10 weight % of polyalphaolefin that is a hydrogenated, highly branched dimer of an alpha olefin having 8-12 carbon atoms, the composition does not comprise between 18 and 25 weight percent of a linear low density polyethylene having a density of 0.912 to 0.935 g/cm³.

In another embodiment the modifier comprises polyalphaolefins (PAO's) comprising oligomers or polymers of linear olefins having 6 to 14 carbon atoms, more preferably 8 to 12 carbon atoms, more preferably 10 carbon atoms, where an individual modifier or a combination of modifiers has a kinematic viscosity at 100° C. of 3 cSt or more, preferably 6 cSt or more, preferably 8 cSt or more (as measured by ASTM D445); and preferably having a Viscosity Index of 100 or more, preferably 110 or more, more preferably 120 or more, more preferably 130 or more, more preferably 140 or more (as determined by ASTM D2270); and having a pour point of −10° C. or less, more preferably −20° C. or less, more preferably −30° C. or less (as determined by ASTM D97).

In another embodiment polyalphaolefin (PAO) oligomers or polymers useful in the present invention comprise $C_{20}$ to $C_{1500}$ paraffins, preferably $C_{35}$ to $C_{400}$ paraffins, preferably $C_{40}$ to $C_{250}$ paraffins. The PAO oligomers/polymers are dimers, trimers, tetramers, pentamers, etc. of $C_5$ to $C_{14}$ α-olefins in one embodiment, and $C_6$ to $C_{14}$ α-olefins in another embodiment, and $C_8$ to $C_{12}$ α-olefins in another embodiment, and $C_{10}$ α-olefins in another embodiment. Suitable olefins include 1-pentene, 1-hexene, 1-heptene, 1-octene, 1-nonene, 1-decene, 1-undecene and 1-dodecene. In one embodiment, the olefin is 1-decene, and the modifier is a mixture of dimers, trimers, tetramers and pentamers (and higher) of 1-decene. In another embodiment, the PAO is comprised of oligomers or polymers of 1-octene, 1-decene, and 1-dodecene. Preferred PAO's are described more particularly in, for example, U.S. Pat. Nos. 5,171,908, and 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999). The PAO oligomers or polymers useful in the present invention may be characterized by any degree of tacticity, including isotacticity or syndiotacticity, and may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

PAO's useful in the present invention typically possess a number average molecular weight of from 300 to 21,000 g/mole in one embodiment, from 400 to 20,000 g/mole. in another embodiment, from 500 to 10,000 g/mole in another embodiment, from 500 to 5,000 g/mole in another embodiment, from 600 to 3,000 g/mole in another embodiment, and from 500 to 1,500 g/mole in yet another embodiment. Preferred PAO's have kinematic viscosities at 100° C. in the range of 3 to 3000 cSt in one embodiment, from 4 to 3000 cSt in another embodiment, from 6 to 300 cSt in another embodiment, and from 8 to 100 cSt in another embodiment. PAO's useful in the present invention typically have pour points of less than −10° C. in one embodiment, and less than −20° C. in another embodiment, and less than −30° C. in yet another embodiment. Preferred PAO's may also have a carbon number of 20 to 1500, preferably 25 to 1500, preferably 35 to 400, preferably 40 to 250. Desirable PAO's are commercially available as SpectraSyn and SpectraSyn Ultra (ExxonMobil Chemical Company, Houston Tex., previously sold under the SHF and SuperSyn tradenames), some of which are summarized in the Table 1b below.

TABLE 1b

SpectraSyn Series Polyalphaolefins

| PAO | KV @ 100° C., cSt | VI | Pour Point, ° C. | Specific gravity | Flash Point, ° C. | APHA Color |
|---|---|---|---|---|---|---|
| SpectraSyn 4 | 4 | 126 | −66 | 0.820 | 220 | 10 |
| SpectraSyn 6 | 6 | 138 | −57 | 0.827 | 246 | 10 |
| SpectraSyn 8 | 8 | 139 | −48 | 0.833 | 260 | 10 |
| SpectraSyn 10 | 10 | 137 | −48 | 0.835 | 266 | 10 |
| SpectraSyn 40 | 39 | 147 | −36 | 0.850 | 281 | 10 |
| SpectraSyn 100 | 100 | 170 | −30 | 0.853 | 283 | 60 |
| SpectraSyn Ultra 150 | 150 | 218 | −33 | 0.850 | >265 | 10 |
| SpectraSyn Ultra 300 | 300 | 241 | −27 | 0.852 | >265 | 20 |
| SpectraSyn Ultra 1000 | 1,000 | 307 | −18 | 0.855 | >265 | 30 |

Other useful PAO's include those sold under the tradenames Synfluid™ available from ChevronPhillips Chemical Company (Pasedena, Tex.), Durasyn™ available from BP Amoco Chemicals (London, England), Nexbase™ available from Fortum Corporation (Keilaniemi, Finland), and Synton™ available from Crompton Corporation (Middlebury, Conn.).

In other embodiments the PAO's have a kinematic viscosity at 100° C. of 3 cSt or more, preferably 6 cSt or more, preferably 8 cSt or more, preferably 10 cSt or more, preferably 20 cSt or more, preferably 300 cSt or less, preferably 100 cSt or less. In another embodiment the PAO's have a kinematic viscosity at 100° C. of between 3 and 1000 cSt, preferably between 6 and 300 cSt, preferably between 8 and 100 cSt, preferably between 8 and 40 cSt.

In other embodiments the PAO's have a Viscosity Index of 120 or more, preferably 130 or more, preferably 140 or more, preferably 150 or more, preferably 170 or more, preferably 200 or more, preferably 250 or more.

In other embodiments the PAO's have a pour point of −10° C. or less, preferably −20° C. or less, preferably −30° C. or less (as determined by ASTM D97).

In other embodiments the PAO's have a flash point of 200° C. or more, preferably 220° C. or more, preferably 240° C. or more, preferably between 260° C. and 290° C.

In another embodiment, the modifier is a high purity hydrocarbon fluid with a branched paraffin : normal paraffin ratio ranging from about 0.5:1 to 9:1, preferably from about 1:1 to 4:1. The branched paraffins of the mixture contain greater than 50 wt % (based on the total weight of the branched paraffins) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like; preferably, greater than 70 wt % of the branched paraffins are mono-methyl species. The paraffin mixture has a number-average carbon number ($C_n$) in the range of 20 to 500, preferably 30 to 400, preferably 40 to 200, preferably 25 to 150, preferably 30 to 100, more preferably 20 to 100, more preferably 20 to 70; has a kinematic viscosity at 100° C. ranging from 3 to 500 cSt, preferably 6 to 200 cSt, preferably 8 to 100 cSt, more preferably 6 to 25 cSt, more preferably 3 to 25 cSt, more preferably 3 to 15 cSt; and boils within a range of from 100 to 350° C., preferably within a range of from 110 to 320° C., preferably within a range of 150 to 300° C. In a preferred embodiment, the paraffinic mixture is derived from a Fischer-Tropsch process. These branch paraffin/n-paraffin blends are described in, for example, U.S. Pat. No. 5,906,727.

In another embodiment, the modifier comprises paraffinic hydrocarbons having:
1. a number average molecular weight of 300 to 10,000 g/mol, preferably 400 to 5,000 g/mol, preferably 500 to 2,500 g/mol, preferably 300 to 1,200 g/mol;
2. less than 10% of sidechains with 4 or more carbons, preferably less than 8%, preferably less than 5%, preferably less than 3%, preferably less than 2%, preferably less than 1%, preferably less than 0.5%, preferably less than 0.1%;
3. at least 15% of sidechains with 1 or 2 carbons, preferably 20% or more, preferably 25% or more, preferably 30% or more, preferably 35% or more, preferably 40% or more, preferably 45% or more, preferably 50% or more;
4. less than 2.5 wt % cyclic paraffins (based on the total weight of paraffins in the mixture), preferably less than 2 wt %, preferably less than 1 wt %, preferably less than 0.5 wt %, preferably less than 0.1 wt %, preferably at less than 0.1 wt %, preferably at 0.001 wt %;
5. a kinematic viscosity at 100° C. of 3 cSt or more, preferably 6 cSt or more, preferably 8 cSt or more, preferably between 3 and 25 cSt; and
6. a viscosity index (VI) of 110 or more, preferably 120 or more, preferably 130 or more, preferably 140 or more, preferably 150 or more, preferably 180 or more, preferably 200 or more, preferably 250 or more, preferably 300 or more; and
7. a pour point of −10° C. or less; and
8. a flash point of 200° C. or more.

In another embodiment, the modifier comprises a wax isomerate lubricant oil basestock, which includes hydroisomerized waxy stocks (e.g. waxy stocks such as gas oils, slack waxes, fuels hydrocracker bottoms, etc.), hydroisomerized Fischer-Tropsch hydrocarbons and waxes, Gas-to-Liquids (GTL) base stocks and base oils, and other waxy feedstock derived hydroisomerized base stocks and base oils, or mixtures thereof. Fischer-Tropsch waxes, the high boiling point residues of Fischer-Tropsch synthesis, are highly paraffinic hydrocarbons with very low sulfur content, and are often preferred feedstocks in processes to make hydrocarbon fluids of lubricating viscosity.

The hydroprocessing used for the production of such base stocks may use an amorphous hydrocracking/hydroisomerization catalyst, such as one of the specialized lube hydrocracking catalysts or a crystalline hydrocracking/hydroisomerization catalyst, preferably a zeolitic catalyst. For example, one useful catalyst is ZSM-48 as described in U.S. Pat. No. 5,075,269. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Particularly favorable processes are described in European Patent Application Nos. 464546 and 464547. Processes using Fischer-Tropsch wax feeds are described in U.S. Pat. Nos. 4,594,172 and 4,943,672.

Gas-to-Liquids (GTL) base stocks and base oils, Fischer-Tropsch hydrocarbon derived base stocks and base oils, and other waxy feedstock derived base stocks and base oils (or wax isomerates) that can be advantageously used in the present invention have a kinematic viscosities at 100° C. of about 3 cSt to about 500 cSt, preferably about 6 cSt to about 200 cSt, preferably about 8 cSt to about 100 cSt, more preferably about 3 cSt to about 25 cSt. These Gas-to-Liquids (GTL) base stocks and base oils, Fischer-Tropsch hydrocarbon derived base stocks and base oils, and other waxy feedstock derived base stocks and base oils (or wax isomerates) have pour points (preferably less than −10° C., preferably about −15° C. or lower, preferably about −25° C. or lower, preferably −30° C. to about −40° C. or lower); have a high viscosity index (preferably 110 or greater, preferably 120 or greater, preferably 130 or greater, preferably 150 or greater); and are typically of high purity (high saturates levels, low-to-nil sulfur content, low-to-nil nitrogen content, low-to-nil aromatics content, low bromine number, low iodine number, and high aniline point). Useful compositions of Gas-to-Liquids (GTL) base stocks and base oils, Fischer-Tropsch hydrocarbon derived base stocks and base oils, and wax isomerate hydroisomerized base stocks and base oils are recited in U.S. Pat. Nos. 6,080,301; 6,090,989, and 6,165,949 for example, and are incorporated herein in their entirety by reference.

In a preferred embodiment the modifier(s) of the present invention comprises a GTL-derived base-stock or base-oil that has a kinematic viscosity at 100° C. of 3 to 500 cSt, preferably 6 to 200 cSt, preferably 8 to 100 cSt, more preferably 3 to 25 cSt; and/or a number average molecular weight ($M_n$) of 300 to 10,000 g/mole, preferably 400 to 5,000 g/mole, preferably 500 to 2,500 g/mole, more preferably 300 to 1,200 g/mole; and/or a carbon number of 20 to 500, preferably 30 to 400, preferably 40 to 200, more preferably 20 to 100.

In another embodiment the modifier comprises a Group III hydrocarbon basestock. Preferably the modifier comprises a severely hydrotreated mineral oil having a saturates levels of 90% or more, preferably 92% or more, preferably 94% or more, preferably 95% or more, and sulfur contents less than 0.03%, preferably between 0.001 and 0.01%, and VI is in excess of 120, preferably 130 or more. Preferably the Group III hydrocarbon base stock has a kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. Preferably the Group III hydrocarbon basestock has a pour point of −10° C. or less, and a flash point of 200° C. or more.

Preferably, the modifier is not an oligomer or polymer of $C_4$ olefin(s) (including all isomers, e.g. n-butene, 2-butene, isobutylene, and butadiene, and mixtures thereof). Such materials, which are referred to as "polybutene" liquids (or "polybutylenes") when the oligomers comprise isobutylene and/or 1-butene and/or 2-butene, are commonly used as additives for polyolefins; e.g. to introduce tack or as a processing aid. The ratio of $C_4$ olefin isomers can vary by manufacturer and by grade, and the material may or may not be hydrogenated after synthesis. Commercial sources of polybutenes include BP (Indopol grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB. Properties of some liquids made from $C_4$ olefin(s) are summarized in Table 1c below. Note that grades with a flash point of 200° C. or more also have a pour point greater than −10° C. and/or a VI less than 120.

TABLE 1c

Commercial Examples of Oligomers of $C_4$ olefin(s)

| Grade | KV @ 100° C., cSt | VI | Pour Point, ° C. | Specific gravity | Flash Point, ° C. |
|---|---|---|---|---|---|
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | 3 | 0.903 | 230 |
| BP Indopol H-25 | 52 | 87 | −23 | 0.869 | ~150 |
| BP Indopol H-50 | 108 | 90 | −13 | 0.884 | ~190 |
| BP Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | 10 | 0.888 | 240 |

*Estimated based on the kinematic viscosity at 100° C. and 38° C.

Preferably, the modifier is not an oligomer or polymer of C4 olefin(s);however, when a modifier is present, an oligomer or polymer of $C_4$ olefin(s) (including all isomers, e.g. n-butene, 2-butene, isobutylene, and butadiene, and mixtures thereof) may be present in the composition. In a preferred embodiment, the composition comprises less than 50 wt % (preferably less than 40%, preferably less than 30 wt %, preferably less than 20 wt %, more preferably less than 10 wt %, more preferably less than 5 wt %, more preferably less than 1 wt %, preferably 0 wt %) polymer or oligomer of $C_4$ olefin(s) such as PIB, polybutene, or PNB, based upon the weight of the composition.

In a preferred embodiment, the modifier contains less than 50 weight % of $C_4$ olefin(s), preferably isobutylene, based upon the weight of the modifier. Preferably the modifier contains less than 45 weight %, preferably less than 40 wt %, preferably less than 35 wt %, preferably less than 30 wt %, preferably less than 25 wt %, preferably less than 20 wt %, preferably less than 15 wt %, preferably less than 10 wt %, preferably 5 wt %, preferably less than 4 wt %, preferably less than 3%, preferably less than 2%, preferably less than 1 wt %, preferably less than 0.5 wt %, preferably less than 0.25 wt % of $C_4$ olefin(s), preferably isobutylene, based upon the weight of the modifier.

In a preferred embodiment, the composition comprises less than 50 wt % (preferably less than 40 wt %, preferably less than 30 wt %, preferably less than 20 wt %, preferably less than 15 wt %, preferably less than 10 wt %, preferably less than 5 wt %, preferably less than 1 wt %, preferably 0%) of ethylene/alpha-olefin co-oligomer or copolymer where the alpha-olefin(s) are chosen from propylene, 1-butene, 1-hexene, and/or 1-octene and the ethylene/alpha-olefin co-oligomer/copolymer is a liquid, based upon the weight of the composition.

Ethylene Polymers

The modifiers described herein are blended with at least one ethylene polymer to prepare the compositions of this invention.

In one aspect of the invention, the ethylene polymer is selected from ethylene homopolymer, ethylene copolymers, and blends thereof. Useful copolymers comprise one or more comonomers in addition to ethylene and can be a random copolymer, a statistical copolymer, a block copolymer, and/or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g. greater than 50 wt %). The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment the ethylene polymers are made by the catalysts, activators and processes described in U.S. Pat. Nos. 6,342,566, 6,384,142, WO 03/040201, WO 97/19991 and U.S. Pat. No. 5,741,563. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the EXAC™, EXCEED™, ESCORENE™, EXXCO™, ESCOR™, ENABLE™, NTX™, PAXON™, and OPTEMA™ tradenames.

Preferred ethylene homopolymers and copolymers useful in this invention typically have:

1. an $M_w$ of 20,000 to 2,000,000 g/mole preferably 30,000 to 1,000,000, more preferably 40,000 to 200,000, as measured by size exclusion chromatography, as described below in the Test Methods section; and /or 2. an $M_w/M_n$ of 1 to 40, preferably 1.6 to 20, more preferably 1.8 to 10, more preferably 1.8 to 4, preferably 8 to 25 as measured by size exclusion chromatography as described below in the Test Methods section; and /or 3. a $T_m$ (first melt peak) of 30 to 150° C., preferably 30 to 140° C., preferably 50 to 140° C., more preferably 60 to 135° C. as determined by the DSC method described below in the Test Methods section; and/or 4. a crystallinity of 5 to 80%, preferably 10 to 70, more preferably 20 to 60% as measured by the DSC method described below in the Test Methods section; and /or 6. a heat of fusion of 300 J/g or less, preferably 10 to 260 J/g, more preferably 20 to 200 J/g as measured by the DSC method described below in the Test Methods section; and/or
7. a crystallization temperature ($T_c$) of 15 to 130° C., preferably 20 to 120° C., more preferably 25 to 110° C., preferably 60 to 125° C., as measured by the method described below in the Test Methods section; and/or
8. a heat deflection temperature of 30 to 120° C., preferably 40 to 100° C., more preferably 50 to 80° C. as measured by the method described below in the Test Methods section; and/or
9. a Shore hardness (D scale) of 10 or more, preferably 20 or more, preferably 30 or more, preferably 40 or more, preferably 100 or less, preferably from 25 to 75 (as measured by ASTM D 2240); and/or
10. a percent crystallinity of at least 30%, preferably at least 40%, alternatively at least 50%, as determined by the DSC method described below in the Test Methods section; and/or
11. a percent amorphous content of at least 50%, alternatively at least 60%, alternatively at least 70%, even alternatively between 50 and 95%, or 70% or less, preferably 60% or less, preferably 50% or less as determined by subtracting the percent crystallinity from 100, and/or
12. a branching index (g') of 0.2 to 2.0, preferably 0.5 to 1.5, preferably 0.7 to 1.1, as measured using the method described below in the Test Methods section, and/or
13. a density of 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$ or alternatively between 0.94 to 0.965 g/cm$^3$ as measured using the method described below in the Test Methods section.

The polyethylene may be an ethylene homopolymer, such as HDPE. In another embodiment the ethylene homopolymer has a molecular weight distribution ($M_w/M_n$) of up to 40, preferably ranging from 1.5 to 20, and from 1.8 to 10 in another embodiment, and from 1.9 to 5 in yet another embodiment, and from 2.0 to 4 in yet another embodiment. In another embodiment, the 1% secant flexural modulus falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured according to ASTM D1238 (190° C., 2.16 kg).

In another embodiment of the invention, the ethylene polymer is an ethylene copolymer, either random, or block, of ethylene and one or more comonomers selected from $C_3$ to $C_{20}$ α-olefins, typically from $C_3$ to $C_{10}$ α-olefins in another embodiment. Preferably the comonomers are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mole in one embodiment, and greater than 10,000 g/mole in another embodiment, and greater than 12,000 g/mole in yet another embodiment, and greater than 20,000 g/mole in yet another embodiment, and less than 1,000,000 g/mole in yet another embodiment, and less than 800,000 g/mole in yet another embodiment, wherein a desirable copolymer may comprise any upper molecular weight limit with any lower molecular weight limit described herein.

In another embodiment the ethylene copolymer comprises ethylene and one or more other monomers selected from the group consisting of ethylene and $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 weight %, preferably from 0 to 40 weight %, more preferably from 0.5 to 30 weight %, more preferably from 2 to 30 weight %, more preferably from 5 to 20 weight %.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Comonomers containing non-aromatic cyclic groups are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mole). Preferred cyclic dienes include cyclopentadiene, vinylnorbornene, norbomadiene, ethylidene norbornene, divinylbenzene, dicyclopentadiene or higher ring containing diolefins with or without substituents at various ring positions.

In a preferred embodiment one or more dienes are present in the ethylene polymer at up to 10 weight %, preferably at 0.00001 to 2 weight %, preferably 0.002 to 1 weight %, even more preferably 0.003 to 0.5 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a particularly desirable embodiment, the ethylene polymer used herein is a plastomer having a density of from 0.91 g/cm$^3$ or less, as determined by ASTM D1505, and a melt index (MI) between 0.1 and 50 dg/min, as determined by ASTM D1238 (190° C., 2.16 kg). In one embodiment, the useful plastomer is a copolymer of ethylene and at least one $C_3$ to $C_{12}$ α-olefin, preferably $C_4$ to $C_8$ α-olefins. The amount of $C_3$ to $C_{12}$ α-olefin present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

Preferred plastomers useful in the invention have a melt index of between 0.1 and 40 dg/min in one embodiment, and from 0.2 to 20 dg/min in another embodiment, and from 0.5 to 10 dg/min in yet another embodiment. The average molecular weight of preferred plastomers ranges from 10,000 to 800,000 g/mole in one embodiment, and from 20,000 to 700,000 g/mole in another embodiment. The 1% secant flexural modulus (ASTM D790) of preferred plastomers ranges from 5 to 100 MPa in one embodiment, and from 10 MPa to 50 MPa in another embodiment. Further, preferred plastomers that are useful in compositions of the present invention have a melting temperature ($T_m$ first melt peak) of from 30 to 100° C. in one embodiment, and from 40 to 80° C. in another embodiment. The degree of crystallinity of preferred plastomers is between 3 and 30%.

Particularly preferred plastomers useful in the present invention are synthesized using a single-site catalyst, such as a metallocene catalyst, and comprise copolymers of ethylene and higher α-olefins such as propylene, 1-butene, 1-hexene and 1-octene, and which contain enough of one or more of these comonomer units to yield a density between 0.86 and 0.91 g/cm$^3$ in one embodiment. The molecular weight distribution ($M_w/M_n$) of desirable plastomers ranges from 1.5 to 5 in one embodiment, and from 2.0 to 4 in another embodiment. Examples of a commercially available plastomers are EXACT™ 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT™ 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

In a preferred embodiment of the present invention, the ethylene polymers have a weight average molecular weight ($M_w$) within the range having an upper limit of 5,000,000 g/mole, 1,000,000 g/mole, or 500,000 g/mole, and a lower limit of 10,000 g/mole, 20,000 g/mole, or 80,000 g/mole.

Preferred ethylene polymers for the present invention have a molecular weight distribution ($M_w/M_n$) ranging from 1.5 to 20, and from 1.6 to 15 in another embodiment, and from 1.7 to 10 in yet another embodiment, and from 1.8 to 5 in yet another embodiment, and from a lower limit of 1.5, 1.8, or 2.0 to an upper limit of 40, 20, 10, 5, or 4.5 in yet another embodiment.

The melt index (MI) of preferred ethylene polymers, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the polymer has a Mooney viscosity, ML(1+4)@ (125° C. (measured according to ASTM D1646) of 100 or less, 75 or less, 60 or less, or 30 or less.

In yet another embodiment, the 1% secant flexural modulus of preferred ethylene polymers ranges from 5 to 1000 MPa, and from 10 to 800 MPa in another embodiment, and from 5 to 200 MPa in yet another embodiment, wherein a desirable polymer may exhibit any combination of any upper flexural modulus limit with any lower flexural modulus limit.

The crystallinity of preferred ethylene polymers useful herein may be expressed in terms of heat of fusion. Embodiments of the present invention include polymers having a heat of fusion, as determined by DSC, ranging from a lower limit of 0.1 J/g, or preferably 1.0 J/g, to an upper limit of 260 J/g, or preferably 240 J/g.

The crystallinity of the polymer may also be expressed in terms of crystallinity percent. The thermal energy for the highest order of polyethylene is estimated at 290 J/g. That is, 100% crystallinity is equal to 290 J/g. Preferably, the polymer has a crystallinity within the range having an upper limit of 80%, 60%, 40%, 30%, or 20%, and a lower limit of 1%, 3%, 5%, 8%, or 10%.

The level of crystallinity may be reflected in the melting point. In one embodiment of the present invention, the ethylene polymer has a single melting point. Typically, a sample of ethylene copolymer will show secondary melting peaks adjacent to the principal peak, which are considered together as a single melting point. The highest of these peaks is considered the melting point. The polymer preferably has a melting point by DSC ranging from an upper limit of 150° C., 130° C., 100° C., 80° C., or 60° C., to a lower limit of 0° C., 20° C., 25° C., 30° C., 35° C., 40° C., or 45° C.

Additives

In one embodiment of compositions of the present invention, conventional plasticizers such as is commonly used for poly(vinyl chloride) are substantially absent. In particular, plasticizers such as phthalates, adipates, trimellitate esters, polyesters, and other functionalized plasticizers as disclosed in, for example, U.S. Pat. Nos. 3,318,835; 4,409,345; WO 02/31044 A1; and PLASTICS ADDITIVES 499-504 (Geoffrey Pritchard, ed., Chapman & Hall 1998) are substantially absent. By "substantially absent", it is meant that these compounds are not added deliberately to the compositions and if present at all, are present at less than 0.5 wt %.

In some embodiments, "naphthenic" mineral oils and "aromatic" mineral oils are substantially absent; i.e., present at less than 0.5 wt % of the inventive composition. In another embodiment, if such oils are present in the composition, the aggregate of such oils is at most 5 wt % of the total liquid modifier in the composition. Also, aromatic moieties and carbon-carbon unsaturation are substantially absent from the modifiers used in the present invention in yet another embodiment. Aromatic moieties include a compound whose molecules have the ring structure characteristic of benzene, naphthalene, phenanthrene, anthracene, etc. By "substantially absent", it is meant that these aromatic compounds or moieties are not added deliberately to the compositions, and if present, are present to less than 0.5 wt % of the composition.

The polyethylene compositions of the present invention may also contain other additives. Those additives include antioxidants, nucleating agents, acid scavengers, stabilizers, anticorrosion agents, blowing agents, other UV absorbers such as chain-breaking antioxidants, etc., quenchers, antistatic agents, slip agents, pigments, dyes and fillers and cure agents such as peroxide. Dyes and other colorants common in the industry may be present from 0.01 to 10 wt % in one embodiment, and from 0.1 to 6 wt % in another embodiment, based upon the weight of the composition.

In particular, antioxidants and stabilizers such as organic phosphites, hindered amines, and phenolic antioxidants may be present in the polyethylene compositions of the invention from 0.001 to 2 wt %, based upon the weight of the composition, in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.001 to 50 wt % in one embodiment, and from 0.01 to 25 wt %, based upon the weight of the composition, in another embodiment, and from 0.2 to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the modifier of the invention pre-contacted, or pre-absorbed into the filler prior to addition to the ethylene polymer in one embodiment.

More particularly, in one embodiment of the present invention, the modifier, or some portion of the modifier, may be blended with a filler, desirably a porous filler. The modifier and filler may be blended by, for example, a tumbler or other wet blending apparatus. The modifier and filler in this embodiment are blended for a time suitable to form a homogenous composition of modifier and filler, desirably from 1 minute to 5 hours in one embodiment. This modifier/filler blend may then be blended with the ethylene polymer useful in the invention in order to effectuate plastication of the ethylene polymer. In another embodiment, a porous filler may be contacted with the modifier, or some portion thereof, prior to contacting the filler with the ethylene polymer. In another embodiment, the porous filler, ethylene polymer and modifier are contacted simultaneously (or in the same blending apparatus). In any case, the filler may be present from 0.1 to 60 wt % of the composition, and from 0.2 to 40 wt % in another embodiment, and from 0.3 to 20 wt % in yet another embodiment.

Metal salts of fatty acids may also be present in the polyethylene compositions of the present invention. Such salts may be present from 0.001 to 1 wt % of the composition in one embodiment, and from 0.01 to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals including Li, Na, Mg, Ca, Sr, Ba, Zn, Cd, Al, Sn, Pb and so forth. Preferable metal salts of fatty acids are magnesium stearate, calcium stearate, sodium stearate, zinc stearate, calcium oleate, zinc oleate, and magnesium oleate.

In a preferred embodiment, slip additives may be present in the compositions of this invention. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition.

Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof.

Preferred slip additives are unsaturated fatty acid amides, which are commercially available from Crompton (Kekamide™ grades), Croda Universal (Crodamide™ grades), and Akzo Nobel Amides Co. Ltd. (ARMOSLIP™ grades). Particularly preferred slip agents include unsaturated fatty acid amides having the chemical structure

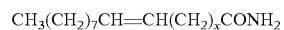

$CH_3(CH_2)_7CH=CH(CH_2)_xCONH_2$ where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in WO 2004/005601A1.

In some embodiments the polyethylenes produced by this invention may be blended with one or more other polymers, including but not limited to, thermoplastic polymer(s) and/or elastomer(s).

By "thermoplastic polymer(s)" is meant a polymer that can be melted by heat and then cooled with out appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By "elastomers" is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the modifier may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene.

In another embodiment the blend comprises 25 wt % or less of a propylene polymer, preferably 20 wt % or less, preferably 15 wt % or less, preferably 10 wt % or less, preferably 5 wt % or less, preferably 0 wt %.

Tackifiers may be blended with the ethylene compositions of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %, based upon the weight of the tackifier.) In some embodiments the tackifier has a softening point (Ring and Ball, as measured by ASTM E-28) of 80° C. to 140° C., preferably 100° C. to 130° C. The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

In another embodiment the polymers of this invention, and/or blends thereof, further comprise typical additives known in the art such as fillers, cavitating agents, antioxidants, surfactants, adjuvants, block, antiblock, color masterbatches, pigments, dyes, processing aids, UV stabilizers, neutralizers, lubricants, waxes, and/or nucleating agents. The additives may be present in the typically effective amounts well known in the art, such as 0.001 weight % to 10 weight %, based upon the weight of the composition. Preferred antioxidants include phenolic antioxidants, such as Irganox 1010, Irganox, 1076 both available from Ciba-Geigy. Preferred fillers, cavitating agents and/or nucleating agents include titanium dioxide, calcium carbonate, barium sulfate, silica, silicon dioxide, carbon black, sand, glass beads, mineral aggregates, talc, clay and the like.

Blending and Processing

The polymers suitable for use in the present invention can be in any physical form when used to blend with the modifier of the invention. In one embodiment, reactor granules, defined as the granules of polymer that are isolated from the polymerization reactor prior to any processing procedures, are used to blend with the modifier of the invention. The reactor granules typically have an average diameter of from 50 µm to 10 mm in one embodiment, and from 10 µm to 5 mm in another embodiment. In another embodiment, the polymer is in the form of pellets, such as, for example, having an average diameter of from 1 mm to 10 mm that are formed from melt extrusion of the reactor granules.

The components of the present invention can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of modifier in the polymer.

The mixing step may involve first dry blending using, for example, a tumble blender, where the polymer and modifier are brought into contact first, without intimate mixing, which may then be followed by melt blending in an extruder. Another method of blending the components is to melt blend the polymer pellets with the modifier directly in an extruder or batch mixer. It may also involve a "master batch" approach, where the final modifier concentration is achieved by combining neat polymer with an appropriate amount of plasticized polymer that had been previously prepared at a higher modifier concentration. The mixing step may take place as part of a processing method used to fabricate articles, such as in the extruder on an injection molding machine or blown-film line or fiber line.

In one aspect of the invention, the ethylene polymer and modifier are "melt blended" in an apparatus such as an extruder (single or twin screw) or batch mixer. The ethylene polymer may also be "dry blended" with the modifier using a tumbler, double-cone blender, ribbon blender, or other suitable blender. In yet another embodiment, the ethylene polymer and modifier are blended by a combination of approaches, for example a tumbler followed by an extruder. A preferred method of blending is to include the final stage of blending as part of an article fabrication step, such as in the extruder used to melt and convey the composition for a molding step like injection molding or blow molding. This could include direct injection of the modifier into the extruder, either before or after the polyethylene is fully melted. Extrusion technology for polyethylene is described in more detail in, for example, PLASTICS EXTRUSION TECHNOLOGY 26-37 (Friedhelm Hensen, ed. Hanser Publishers 1988).

In another aspect of the invention, the polyethylene composition may be blended in solution by any suitable means, by using a solvent that dissolves both components to a significant extent. The blending may occur at any temperature or pressure where the modifier and the ethylene polymer remain in solution. Preferred conditions include blending at high temperatures, such as 10° C. or more, preferably 20° C. or more over the melting point of the ethylene polymer. Such solution blending would be particularly useful in processes where the ethylene polymer is made by solution process and the modifier is added directly to the finishing train, rather than added to the dry polymer in another blending step altogether. Such solution blending would also be particularly useful in processes where the ethylene polymer is made in a bulk or high pressure process where the both the polymer and the modifier were soluble in the monomer. As with the solution process the modifier is added directly to the finishing train, rather than added to the dry polymer in another blending step altogether.

Thus, in the cases of fabrication of articles using methods that involve an extruder, such as injection molding or blow molding, any means of combining the polyethylene and modifier to achieve the desired composition serve equally well as fully formulated pre-blended pellets, since the forming process includes a re-melting and mixing of the raw material; example combinations include simple blends of neat polymer pellets and modifier, of neat polymer granules and modifier, of neat polymer pellets and pre-blended pellets, and neat polymer granules and pre-blended pellets. Here, "pre-blended pellets" means pellets of a polyethylene composition comprising ethylene polymer and modifier at some concentration. In the process of compression molding, however, little mixing of the melt components occurs, and pre-blended pellets would be preferred over simple blends of the constituent pellets (or granules) and modifier. Those skilled in the art will be able to determine the appropriate procedure for blending of the polymers to balance the need for intimate mixing of the component ingredients with the desire for process economy.

Applications

The enhanced properties of the polyethylene compositions described herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions of the invention include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, preferably uniform, blend will be produced prior to conversion into a finished product.

Adhesives

The polymers of this invention or blends thereof can be used as adhesives, either alone or combined with tackifiers. Preferred tackifiers are described above. The tackifier is typically present at about 1 weight % to about 50 weight %, based upon the weight of the blend, more preferably 10 weight % to 40 weight %, even more preferably 20 weight % to 40 weight %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In multilayer constructions, the other layer(s) may be any layer typically included in multilayer film structures. For example the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar polymers. Preferred polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application, however films of a thickness from 1 to 250 μm are usually suitable. Films intended for packaging are usually from 10 to 60 micron thick. The thickness of the sealing layer is typically 0.2 to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads, preferably these additives are present at from 0.1 to 1000 ppm.

In another embodiment one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees. For more information on blendsof tackifiers and modifiers useful herein, see U.S. Ser. No. 60/617,594, filed Oct. 8, 2004.

The films described above may be used as stretch and/or cling films. Stretch/cling films are used in various bundling, packaging and palletizing operations. To impart cling properties to, or improve the cling properties of, a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred is linear low density polyethylene (LLDPE). Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

Molded and Extruded Products

The polyethylene composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30 to 65° C. is desirable. The part is below 90 to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150 to 235° C., the feed blocks are from 90 to 250° C., and the water cooling tank temperatures are from 10 to 40° C.

One embodiment of an injection molding process is described as follows. The shaped laminate is placed into the injection molding tool. The mold is closed and the substrate material is injected into the mold. The substrate material has a melt temperature between 180 and 300° C. in one embodiment, and from 200 and 250° C. in another embodiment, and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,000 to 15,000 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternatively by calendering. Sheet will generally be considered to have a thickness of from 10 to 100 mils (254 to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 to 2.54 cm in outside diameter, and have a wall thickness of in the range of from 254 µm to 0.5 cm. The pipe will generally be in the range of from 2.54 to 254 cm in outside diameter, and have a wall thickness of in the range of from 0.5 to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 190 and 255° C. in one embodiment, and between 210 and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures.

It will be understood by those skilled in the art that the steps outlined above may be varied, depending upon the desired result. For example, the an extruded sheet of the compositions of this invention may be directly thermoformed or blow molded without cooling, thus skipping a cooling step. Other parameters may be varied as well in order to achieve a finished composite article having desirable features.

In another embodiment, this invention reatles to:
1. A composition comprising more than 25 weight % (based on the weight of the composition) of one or more ethylene polymers having an $M_w$ of 20,000 g/mole or more and at least 0.1 weight % of a liquid hydrocarbon modifier where the modifier has:
  1) a viscosity index of 120 or more, and
  2) an kinematic viscosity of 3 to 3000 cSt at 100° C., and 3) a pour point of −10° C. or less, and
4) a flash point of 200° C. or more;
and wherein the modifier contains less than 5 weight % of functional groups selected from hydroxide, aryls, substituted aryls, halogens, alkoxys, carboxylates, esters, acrylates, oxygen, nitrogen, and carboxyl, based upon the weight of the modifier.

2. The composition of paragraph 1 wherein the modifier contains less than 50 weight % $C_4$ olefin(s), based upon the weight of the modifier.

3. The composition of paragraph 2 wherein the modifier contains less than 50 weight % isobutylene groups.

4. The composition of paragraph 1, 2 or 3 wherein the modifier is present at 1 weight % or more.

5. The composition of any of the above paragraphs wherein the composition comprises less than 40 weight % propylene polymer.

6. The composition of any of the above paragraphs wherein the composition comprises less than 40 weight % of a polymer or oligomer of $C_4$ olefin(s).

7. The composition of any of the above paragraphs wherein the modifier is not an ethylene/alpha-olefin copolymer or co-oligomer.

8. The composition of any of the above claims wherein the composition comprises 25 wt % or less of a propylene polymer, based upon the weight of the composition.

9. The composition of any of the above paragraphs wherein the modifier comprises $C_{20}$ to $C_{1500}$ paraffins.

10. The composition of paragraph 1 wherein the modifier comprises oligomers of $C_5$ to $C_{14}$ olefins.

11. The composition of paragraph 10 wherein the modifier comprises oligomers of 1-pentene, 1-hexene, 1-heptene, 1-octene, 1-nonene, 1-decene, 1-undodecene and or 1-dodecene.

12. The composition of paragraph 1, 2, 3, 4, 5, or 6 wherein the modifier comprises oligomers or polymers of decene having a carbon number of 20 to 1500.

13. The composition of paragraph 12 wherein the modifier comprises oligomers of decene having a carbon number of 35-400.

14. The composition of paragraph 1, 2, 3, 4, 5, or 6 wherein the modifier comprises oligomers of octene, decene, and/or dodecene having a carbon number of 35-400.

15. The composition of paragraph 1, 2, 3, 4, 5, or 6, wherein the modifier comprises a mixture of linear and branched paraffinic hydrocarbon composition having a number-average molecular weight of 300 to 10,000 g/mole; having a branched paraffin : normal paraffin ratio ranging from about 0.5:1 to 9:1; having less than 10% sidechains with 4 or more carbons and at least 15% sidechains with 1 or 2 carbons; and where the modifier comprises less than 2 weight % cyclic paraffins.

16. The composition of paragraph 1, 2, 3, 4, 5, or 6, wherein the modifier comprises a paraffinic composition derived from Fischer-Tropsch hydrocarbons and/or waxes, including wax isomerate lubricant oil basestocks and Gas-to-Liquids basestocks, having a kinematic viscosity at 100° C. of about 3 cSt to about 500 cSt.

17. The composition of paragraph 1, 2, 3, 4, 5, or 6, wherein the modifier comprises a mineral oil having a saturates levels of 90% or more and a sulfur content of 0.03% or less.

18. The composition of any of paragraphs 1 to 17 wherein the modifier has a kinematic viscosity of 3 cSt or more at 100° C.

19. The composition of any of paragraphs 1 to 17 wherein the modifier has a kinematic viscosity of 6 to 300 cSt at 100° C.

20. The composition according to any of the above paragraphs where the modifier has an initial boiling point greater than 300° C.

21. The composition according to any of the above paragraphs wherein the modifier has a viscosity index of 130 or more.

22. The composition according to any of the above paragraphs wherein the modifier has a viscosity index of 150 or more.

23. The composition of any of the above paragraphs wherein the modifier has a viscosity index of 200 or more.

24. The composition according to any of the above paragraphs where the modifier comprises 0.1 weight % or less of functional groups selected from hydroxide, aryls, substituted aryls, halogens, alkoxys, carboxylates, esters, acrylates, oxygen, nitrogen, and carboxyl, based upon the weight of the modifier.

25. The composition according to any of the above paragraphs where the number of carbons of the modifier involved in olefinic bonds is less than 10% of the total number of carbon atoms in the modifier.

26. The composition according to any of the above paragraphs where the number of carbons of the modifier involved in olefinic bonds is less than 5 % of the total number of carbon atoms in the modifier.

27. The composition according to any of the above paragraphs where the modifier has a glass transition temperature ($T_g$) that cannot be determined or if it can be determined then the $T_g$ is less than 0° C.

28. The composition according to any of the above paragraphs where the modifier has an initial boiling point greater than 350° C.

29. The composition according to any of the above paragraphs where the modifier has a pour point of −20° C. or less.

30. The composition according to any of the above paragraphs where the modifier has a specific gravity (15.6° C./15.6° C.) from 0.81 to 0.86.

31. The composition according to any of the paragraphs 1 to 29 where the modifier has a specific gravity (15.6° C./15.6° C.) less than 0.85 and a kinematic viscosity at 100° C. of 3 cSt or more.

32. The composition according to any of the paragraphs 1 to 29 where the modifier has a specific gravity (15.6° C./15.6° C.) less than 0.86 and a kinematic viscosity at 100° C. of 5 cSt or more.

33. The composition according to any of the paragraphs 1 to 29 where the modifier has a specific gravity (15.6° C./15.6° C.) less than 0.87 and a kinematic viscosity at 100° C. of 10 cSt or more.

34. The composition according to any of the paragraphs 1 to 29 where the modifier has a specific gravity (15.6° C./15.6° C.) less than 0.88 and a kinematic viscosity at 100° C. of 15 cSt or more.

35. The composition according to any of the above paragraphs where the modifier has a final boiling point of greater than 400° C.

36. The composition according to any of the above paragraphs where the modifier has a number average molecular weight between 5,000 and 500 g/mole.

37. The composition according to any of the above paragraphs where the modifier has a flash point of 250° C. or greater.

38. The composition according to any of the above paragraphs where the modifier has a dielectric constant at 20° C. of less than 2.3.

39. The composition according to any of the above paragraphs where the modifier has a carbon number of from 20 to 500.

40. The composition according to any of the above paragraphs where the modifier has a carbon number of from 30 to 400.

41. The composition according to any of the above paragraphs where the modifier has a carbon number of from 40 to 200.
42. The composition according to any of the above paragraphs where the modifier has an APHA color of 100 or less.
43. The composition according to any of the above paragraphs where the weight loss (in excess of that measured for the base polyethylene) is less than 3% for a 0.25 mm thick sheet that has been stored in a dry 70° C. oven for 300 hours.
44. The composition according to any of the above paragraphs where the ethylene polymer comprises homopolyethylene.
45. The composition of any of the above paragraphs 1 to 43 where the ethylene polymer comprises a copolymer of ethylene and one or more $C_3$ to $C_{20}$ alphaolefins.
46. The composition of any of the above paragraphs where the polyethylene has an $M_w$ of 20,000 to 1,000,000 g/mole.
47. The composition of any of the above paragraphs where the polyethylene has an $M_w/M_n$ of 1.6 to 30.
48. The composition of any of the above paragraphs where the ethylene polymer has a melting point (second melt) of 30 to 145° C.
49. The composition of any of the above paragraphs where the ethylene polymer has a crystallinity of 2 to 80%.
50. The composition of any of the above paragraphs where the ethylene polymer has a heat of fusion between 10 to 230 J/g.
51. The composition of any of the above paragraphs where the ethylene polymer has a 1% secant flexural modulus of from 5 to 1000 MPa.
52. The composition of any of the above paragraphs where the ethylene polymer has a melt index from 0.02 to 500 dg/min.
53. The composition of any of the above paragraphs 1 to 43 or 45 to 52 where the ethylene polymer comprises a copolymer of ethylene and from 0.5 to 30 weight % of one or more comonomers selected from the group consisting of propylene, butene, pentene, hexene, heptene, octene, nonene, decene, dodecene, 4-methyl-pentene-1,3-methyl pentene-1,5-ethyl-1-nonene, and 3,5,5-trimethyl-hexene-1.
54. The composition of any of the above paragraphs where the ethylene polymer is present at 50 to 99.9 weight %, based upon the weight of the ethylene polymer and the modifier.
55. The composition of any of the above paragraphs where modifier is present at 0.5 to 50 weight %, based upon the weight of the ethylene polymer and the modifier.
56. The composition of any of the above paragraphs where modifier is present at 1 to 20 weight %, based upon the weight of the ethylene polymer and the modifier.
57. The composition of any of the above paragraphs wherein polyethylene or polypropylene having a weight average molecular weight of from 500 to 10,000 g/mole is substantially absent and or wherein phthalates, adipates, trimellitate esters, and polyesters are substantially absent.
58. The composition of any of the above paragraphs where the composition further comprises an elastomer.
59. The composition of any of the above paragraphs wherein the ethylene polymer has a density of 0.85 to 0.97 g/cm³.
60. The composition of any of the above paragraphs wherein the ethylene polymer has a density of 0.86 to 0.91 g/cm³.
61. The composition of any of the above paragraphs wherein the ethylene polymer has a density of 0.91 to 0.94 g/cm³.
62. The composition of any of the above paragraphs wherein the ethylene polymer has a density of 0.94 to 0.965 g/cm³.
63. An article of manufacture comprising the composition of any of the above paragraphs.
64. The article of manufacture of paragraph 63 where the article is selected from the group consisting of: cookware, storage ware, furniture, automotive components, boat components, toys, sportswear, medical devices, medical devices, sterilization containers, nonwoven fibers, nonwoven fabrics, drapes, gowns, filters, hygiene products, diapers, films, oriented films, sheets, tubes, pipes, films, sheets, fibers, woven fabrics, tubes, pipes, sporting equipment, tubing, pipes, wire jacketing, cable jacketing, agricultural films, geomembranes, bumpers, grills, trim parts, dashboards, instrument panels, exterior door components, hood components, spoiler, wind screen, hub caps, mirror housing, body panel, protective side molding, crates, containers, packaging, labware, office floor mats, instrumentation sample holders, sample windows; liquid storage containers, bags, pouches, bottles for storage and IV infusion of blood or solutions; packaging material for any medical device or drugs including unit-dose, blister pack, bubble pack, adhesives, shoe soles, gaskets, bellows, elastic fibers, and sealants.
65. A method to make an article of manufacture comprising subjecting the composition of any of paragraphs 1 to 62 to one or more of: injection molding, compression molding, transfer molding, casting, extruding, thermoforming, blow molding, spunbonding, meltblowing, laminating, pultrusion, fiber spinning, draw reduction, rotational molding, spinbonding, melt spinning, melt blowing; or combinations thereof.
66. A film comprising the composition of any of paragraphs 1 to 62.
67. A method to make a polyethylene composition comprising polymerizing ethylene in a solution process and introducing a liquid hydrocarbon modifier that is soluble in the solvent medium into the polymer solution prior to removing the solvent, where the liquid hydrocarbon modifier has:
 1) a viscosity index of 120 or more, and
 2) an kinematic viscosity of 3 to 3000 cSt at 100° C., and
 3) a pour point of −10° C. or less, and
 4) a flash point of 200° C. or more;
 and wherein the modifier contains less than 5 weight % of functional groups selected from hydroxide, aryls, substituted aryls, halogens, alkoxys, carboxylates, esters, acrylates, oxygen, nitrogen, and carboxyl, based upon the weight of the modifier.
68. A method to make a polyethylene composition comprising polymerizing the ethylene in a bulk process and introducing a liquid hydrocarbon modifier that is soluble in the bulk medium into the polymer solution prior to removing the solvent, where the liquid hydrocarbon modifier where the modifier has:
 1) a viscosity index of 120 or more, and
 2) an kinematic viscosity of 3 to 3000 cSt at 100° C., and
 3) a pour point of −10° C. or less
 4) a flash point of 200° C. or more;
 and wherein the modifier contains less than 5 weight % of functional groups selected from hydroxide, aryls, substituted aryls, halogens, alkoxys, carboxylates, esters, acrylates, oxygen, nitrogen, and carboxyl, based upon the weight of the modifier.
69. The composition of any of paragraphs 1 to 62 where in the 1% secant flexural modulus is reduced by 10% or more while the melting point is lowered by 1° C. or less for every 10 weight % of modifier added, as compared to the exact same composition without the modifier present.
70. The composition of any of the above paragraphs wherein the modifier has:
 1) kinematic viscosity at 100° C. of 6 cSt or greater,
 2) a pour point of −20° C. or less, and
 3) a viscosity index of 130 or more, and
 4) an APHA color of 80 or less, and
 5) a flash point of 240° C. or more, and
 6) a specific gravity (15.6° C.) of less than 0.86.

71. The composition of any of the above paragraphs wherein the modifier has:
1) kinematic viscosity at 100° C. of 6 cSt or greater,
2) a pour point of −30° C. or less, and
3) a viscosity index of 130 or more, and
4) an APHA color of 20 or less, and
5) a flash point of 250° C. or more, and
6) a specific gravity (15.6° C.) of less than 0.86.
72. The composition of paragraph 1 wherein the modifier comprises an oligomer or polymer of $C_5$ to $C_{14}$ olefins and has a kinematic viscosity at 100° C. of 6 to 300 cSt; and or a number average molecular weight of 600 to 3000 g/mol.
73. The composition of paragraph 1 wherein the modifier comprises Fischer Tropsch hydrocarbons and/or waxes, and has a kinematic viscosity at 100° C. of 6 to 200 cSt; and/or a number average molecular weight ($M_n$) of 500 to 2,500 g/mole.
74. The composition of paragraph 1 wherein the modifier comprises a Group III basestock and has a kinematic viscosity at 100° C. of 4 to 50 cSt; and/or a number average molecular weight ($M_n$) of 400 to 1,000 g/mole.
75. The composition of paragraph 1 wherein the ethylene polymer has a density of 0.910 to 0.97 g/cm³.
76. The composition of paragraph 1, wherein the Tan Delta (as measured by DMTA) increases by 0.05 for every 10 weight % of modifier added to the composition, as compared to the same composition without the modifier present.

Test Methods

Fluid Properties

Pour Point is measured by ASTM D97. Kinematic Viscosity (KV) is measured by ASTM D445. Viscosity index (VI) is determined by ASTM D2270. Color (APHA scale) is determined by ASTM D1209. Specific gravity is determined by ASTM D4052. Flash point is determined by ASTM D92.

Saturates content (wt %) is determined according to ASTM D2007. Sulfur content (wt %) is determined according to ASTM D2622. The percent of carbons involved in olefinic bonds (i.e., olefinic carbons) is determined by liquid-state proton-NMR spectroscopy. Approximately 50 mg of fluid is dissolved in 1 g of deuterated chloroform, which is used as the NMR lock solvent. Relaxation times for the protons are on the order of a few seconds, allowing recycle delays of 6-10 seconds. Spectra are acquired at 30° C. using an acquisition time of one hour, although an increase in temperature and acquisition time may yield marginal improvement in signal-to-noise. The fraction of olefinic carbons is determined by taking the ratio of olefinic carbons to the total number of carbons (olefinic+aliphatic). These, in turn, can be determined from the proton integrals after correction for the proton multiplicity of each carbon type. The olefins are grouped into four structures: vinyl, 1,2-disubstituted, trisubstituted, and vinylidene (1,1-disubstituted), which have three, two, one, and two protons, respectively. The approximate chemical shift ranges (bands) for these structures are tabulated below along with the number of protons contributed to that region by each olefin type:

| Type | Band (ppm): | Number of protons |
| --- | --- | --- |
| vinyl | 5.9-5.65 | 1 |
| 1,2-disubstituted | 5.5-5.3 | 2 |
| trisubstituted + vinyl | 5.3-4.85 | 1 trisub, 2 vinyl |
| vinylidene | 4.85-4.55 | 2 |

The actual chemical shift range for each band may be slightly different from those listed above; appropriate integration limits are apparent from visual inspection of the spectrum by one skilled in the art. The concentration of each olefin type can be determined by dividing the integral for the relevant region by the proton multiplicity of the contributing olefin. The combined trisubstituted+vinyl region is corrected for vinyl content by subtracting twice the integral over 5.9-5.65 ppm and assigning the remainder to trisubstituted olefin. The aliphatic integral (from approximately 3 ppm to 0.5 ppm) is assumed to arise entirely from $CH_2$ groups since the bulk of aliphatic carbons are in $CH_2$ groups and each aliphatic carbon in a $CH_3$ group is balanced by an aliphatic carbon in a CH group (on average). Dividing the aliphatic integral by two gives the number of aliphatic carbons. The sum of the olefin group concentrations times 100, divided by the sum of aliphatic and olefinic carbons, gives the olefin concentration as number of olefinic bonds per 100 carbons. Then multiplying this value by two gives the number of olefinic carbons per 100 carbons, or the percent of carbons involved in olefinic bonds.

The number average molecular weight ($M_n$) is determined by gas chromatography (GC, described below), unless the kinematic viscosity at 100° C. is greater than 10 cSt in which case it is determined by gel permeation chromatography (GPC, described below). The average carbon number ($C_n$) is calculated from $M_n$ using the formula: $C_n = (M_n - 2)/14$.

The principles of gas chromatography (GC) are described in "Modern Practice of Gas Chromatography", R. L. Grob and E. F. Barry, Wiley-Interscience, 3rd Edition (July 1995). For the hydrocarbon modifiers of this invention, the correlation of chromatographic retention time and molecular weight is obtained by using a non-polar capillary GC column and linear hydrocarbon standards. The sample is dissolved in pentane at a concentration of about 1 volume % to make the sample solution. At least 5 linear hydrocarbon standards (chemical formula $C_nH_{n+2}$, molecular weight=14*n+2 g/mole) are dissolved in pentane (each at a concentration of 2 mg/mL) to make the standards solution. The choice of standards is dictated by the molecular weight of the sample, as follows: at least one standard must elute before the sample and at least one standard must elute after the sample, while the other standards span between these two limits. The gas chromatograph is equipped with a flame-ionization detector and a 0.52-mm by 16-m fused-silica capillary column coated with 0.1-mm "G2" stationary phase (dimethylpolysiloxane gum). The carrier gas is helium flowing at a rate of about 10 mL/min. Initially, the column is maintained at a temperature of 35° C., then immediately after injection, the temperature is increased at a rate of 5° C./min to a temperature of 50° C., then increased to 170° C. at a rate of 12° C./min, then increased from 170° C. to 310° C. at a rate of 10° C./min, and maintained at 310° C. for 18 minutes. The injection port temperature is maintained at about 35° C., and the detector temperature is maintained at about 320° C. About 2 μL of the standards solution is injected into the chromatograph, and the chromatogram (relative weight fraction as a function of elution time) is recorded; this process is repeated for each sample solution. The peak elution times for the standards are used to create a calibration curve of molecular weight vs elution time. This calibration curves is then applied to the sample chromatogram to determine the molecular weight distribution; $M_n$ is the number-average molecular weight calculated from this distribution.

The principles of gel permeation chromatography (GPC) are described in "Modern Size Exclusion Liquid Chromatographs", W. W. Yan, J. J. Kirkland, and D. D. Bly, J. Wiley & Sons (1979). The specific protocol for the hydrocarbon modifiers of this invention follows ASTM D3593. $M_n$ is the number-average molecular weight calculated by applying the calibration curve (molecular weight vs elution time) established using polystyrene standards. The mobile phase is toluene; the column set is chosen to give a linear calibration curve over the entire elution range of interest for the sample(s); and the temperature of the GPC instrumentation is maintained at 35° C.

Melt Index of Polymers and Polymer Blends

The Melt Index (MI), is measured according to ASTM D1238 at 190° C., under a load of 2.16 kg unless otherwise noted. Another typical condition is 190° C. and 21.6 kg load. The units for MI are g/10 min, or dg/min. Typically, a portion of the sample extruded during the test was collected and weighed. This is commonly referred to as the modification 1 of the experimental procedure. The analysis is conducted with a 1 minute preheat on the sample to provide a steady temperature for the duration of the experiment.

Density of Polymers and Polymer Blends

Density is measured by density-gradient column, as described in ASTM D1505, on a compression-molded specimen that has been slowly cooled to room temperature (i.e., over a period of 10 minutes or more) and allowed to age for a sufficient time that the density is constant within ±0.001 g/cm$^3$. The units for density are g/cm$^3$.

Rheology of Polymers and Polymer Blends

The dynamic shear viscosity as a function of frequency was determined by small-amplitude oscillatory shear rheology. A Rheometrics Scientific DSR-500 dynamic stress-controlled rheometer with a cone and plate sample fixture was used. Testing was performed at 190° C., Samples were subjected to an oscillatory shear stress at a nominal amplitude of 100 Pa by oscillating the upper cone at a fixed frequency, and the resultant strain was measured. The auto-stress adjustment capability was utilized to keep the strain within limits of 1-30% (stress adjustment setting=32% of current stress, maximum stress=100 Pa). These conditions ensure that each material was characterized within its linear viscoelastic region. The dynamic shear viscosity was calculated from the measured strain and applied stress as a function of frequency. Frequency sweeps were conducted starting at 500 rad/s and decreasing to 0.02 rad/s, using a logarithmic sweep mode with 6 points per decade.

The dynamic shear viscosity ($\eta^*$) versus frequency ($\omega$) curves were fitted using the Cross model (see, for example, C. W. Macosco, RHEOLOGY: PRINCIPLES, MEASUREMENTS, AND APPLICATIONS, Wiley-VCH, 1994):

$$\eta^* = \frac{\eta_0}{1 + (\lambda \omega)^{1-n}}$$

The three parameters in this model are: $\eta_0$, the zero-shear viscosity; $\lambda$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1–n on a log($\eta^*$)–log($\omega$) plot. For Newtonian fluids, n=1 and the dynamic viscosity is independent of frequency. For the polymers of interest here, n<1, so that enhanced shear-thinning behavior is indicated by a decrease in n (increase in 1–n).

Differential Scanning Calorimetry (DSC)

Crystallization temperature ($T_c$) and melting temperature ($T_m$) were measured using Differential Scanning Calorimetry (DSC). This analysis was conducted using either a TA Instruments MDSC 2920 or a Perkin Elmer DSC7. Typically, 6 to 10 mg of molded polymer or modified polyethylene composition was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to 25° C. at a cooling rate of 10° C./min. The sample was then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported in the tables are the peak melting temperatures from the second heat unless otherwise indicated. For polymers displaying multiple peaks, the higher melting peak temperature is reported.

Areas under the curve is used to determine the heat of fusion ($\Delta H_f$) which is then used to calculate the degree of crystallinity. A value of 290 J/g is used for the equilibrium heat of fusion for 100% crystalline polyethylene, so that the percent crystallinity is calculated using the formula, [% crystallinity=area under the curve (J/g)/290 (J/g)]*100.

Size-Exclusion Chromatography of Ethylene Polymer(s)

Polymer molecular weight (weight-average molecular weight, $M_w$, and number-average molecular weight, $M_n$) and molecular weight distribution ($M_w/M_n$) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 cm$^3$/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample the DRI detector and the injector are purged. Flow rate in the apparatus is then increased to 0.5 ml/minute, and the DRI allowed to stabilize for 8-9 hours before injecting the first sample. The LS laser is turned on 1 to 1.5 hours before running samples.

The concentration, c, at each point in the chromatogram is calculated from the DRI signal after subtracting the prevailing baseline, $I_{DRI}$, using the following equation:

$$c = K_{DRI} I_{DRI} / (dn/dc)$$

where $K_{DRI}$ is a constant determined by calibrating the DRI, and (dn/dc) is the same as described below for the LS analysis. The processes of subtracting the prevailing baseline (i.e., background signal) and setting integration limits that define the starting and ending points of the chromatogram are well known to those familiar with SEC analysis. Units on parameters throughout this description of the SEC method are such that concentration is expressed in g/cm$^3$, molecular weight is expressed in g/mole, and intrinsic viscosity is expressed in dL/g.

The light scattering detector is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and $\lambda$=690 nm. In addition, $A_2$=0.0015 and (dn/dc)=0.104 for polyethylene in TCB at 135° C.; both parameters may vary with average composition of a ethylene copolymer. Thus, the molecular weight determined by LS analysis is calculated by solving the above equations for each point in the chromatogram; together these allow for calculation of the average molecular weight and molecular weight distribution by LS analysis.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$$(\eta_s)_i = c_i [\eta]_i + 0.3(c_i [\eta]_i)^2$$

where $c_i$ is the concentration at point i as determined from the DRI analysis.

The branching index (g') is calculated using the output of the SEC-DRI-LS-VIS method (described above) as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_v^\alpha}$$

where the Mark-Houwink parameters k and $\alpha$ are given by k=0.00058 for polyethylene homopolymer, and $\alpha$=0.695 for all polyethylene polymers. For ethylene copolymers, k decreases with increasing comonomer content. $M_v$ is the viscosity-average molecular weight based on molecular weights determined by LS analysis.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), pages 6812-6820).

Dynamic Mechanical Thermal Analysis (DMTA) of Polymers and Polymer Blends

Dynamic mechanical thermal analysis (DMTA) was used to measure the small-strain mechanical response (relaxation behavior) of samples in the solid-state as a function of temperature over a temperature range that included the viscoelastic region prior to melting.

Testing was performed on a TA Instruments DMA 2980 using a three point bending configuration. A solid rectangular compression-molded bar was placed on two fixed supports; a movable clamp applied a periodic deformation to the sample midpoint at a frequency of 1 Hz and an amplitude of 20 µm. The bar was initially cooled to −120° C. then heated to 70° C. at a heating rate of 3° C./min. Typically, only one bar was tested for each neat material or blend.

The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan $[\delta]$) gives a measure of the damping ability of the material. Energy dissipation mechanisms (i.e., relaxation modes) show up as peaks in tan$[\delta]$, and are associated with a drop in E' as a function of temperature. The uncertainty associated with reported values of E' is expected to be on the order of ±10%, due to variability introduced by the compression-molding process.

Of particular interest for mechanical properties of polyethylene materials is the relaxation behavior at low temperatures, specifically over the range of −100 to 20° C.; any energy dissipation mechanism in this region is identified as a low-temperature relaxation mode (LTRM) for the purposes of this patent. For pure polyethylene, the LTRM is often identified as the "β-relaxation" mode, and is typically very broad in temperature range. We simply characterize the LTRM, without ascribing a physical origin, using the onset temperature (defined as the extrapolated tangent to the tan $[\delta]$ peak), the tan $[\delta]$ peak temperature, and the area under the tan $[\delta]$ peak. Evidence of improved low-temperature toughness of the material upon plasticizing may be shown by 1) appearance of a new LTRM, 2) enhancement of an existing LTRM in the form of a larger area under the tan $\delta$ peak, and/or 3) shifting of an existing LTRM to lower temperatures. The value of E' at −30° C. provides a measure of stiffness at low temperatures, while the value of E' at 25° C. provides a measure of the stiffness at room temperature (analogous to the flexural modulus).

Mechanical Properties of Polymers and Polymer Blends

Tensile properties at room temperature (23±2° C.) are determined according to ASTM D638, including Young's modulus (also called modulus of elasticity), yield stress (also called tensile strength at yield), yield strain (also called elongation at yield), break stress (also called tensile strength at break), and break strain (also called elongation at break). The energy to yield is defined as the area under the stress-strain curve from zero strain to the yield strain. The energy to break is defined as the area under the stress-strain from zero strain to the break strain.

Injection-molded tensile bars were of ASTM D638 Type IV geometry, and were tested at a speed of 2 inch/min. Compression-molded tensile bars of harder materials (Young's modulus >about 10 kpsi, such as HDPE) were of ASTM D638

Type IV geometry and were tested at a speed of 2 inch/min. Compression-molded tensile bars of softer materials (Young's modulus <about 10 kpsi, such as EVA and plastomer) were of ASTM D412 Type C geometry and were tested at a speed of 20 inch/min; in this last case, the yield stress and yield strain were determined as the 10% offset values as defined in ASTM D638. Break properties were reported only if a majority of test specimens broke before a strain of about 2000%, which is the maximum strain possible on the load frame used for testing.

Flexural properties at room temperature are determined according to ASTM D790A, including the 1% secant modulus, 2% secant modulus, and tangent modulus. Test specimen geometry was as specified under the ASTM D790 section "Molding Materials (Thermoplastics and Thermosets)," and the support span was 2 inches (5.08 cm).

Notched Izod impact resistance is determined according to ASTM D256, at the specified temperature. A TMI Izod Impact Tester was used. Pairs of specimens were made by cutting injection-molded ASTM D790 "Molding Materials (Thermoplastics and Thermosets)" bars in half. The notch was oriented such that the impact occurred on the notched side of the specimen (following Procedure A of ASTM D256). All specimens were assigned a thickness of 0.122 inch (0.31 cm) for calculation of the impact resistance. All breaks were complete, unless specified otherwise.

Tensile impact strength at room temperature is measured according to ASTM D1822 on compression molded plaques.

Environmental Stress Crack Resistance (ESCR) is measured according to ASTM D1693 on bent-strip specimens. $F_{50}$ values (the time in hours estimated for a 50% failure rate) were measured in a 10% Igepal solution.

Heat deflection temperature (HDT) is measured according to ASTM D648 on injection molded flexure bars, at 66 psi load (455 kPa).

Film Properties

Flexural and tensile properties (including 1% Secant Flexural Modulus, Tensile Strength at Yield, Elongation at Yield, Ultimate Tensile Strength, and Elongation at Break) are determined by ASTM D882. Elmendorf tear is determined by ASTM D1922, and normalized by the average film thickness in mil (0.001 in, 0.00254 cm). Dart drop impact resistance for blown films is measured following ASTM D1709 (Method A) on specimens that had been aged for at least 2 weeks. Specimen thickness did not comply with ASTM D1709. $F_{50}$ weights (i.e., the drop weight in grams estimated for a 50% failure rate) were normalized by the average film thickness in mil (1 mil=0.001 inch=0.00254 cm=25.4 µm). Puncture resistance for blown films is measured using the procedure of ASTM D5748 on specimens that had been aged at room temperature for at least 2 weeks, except that a matte-finished hemisphere-tipped stainless steel probe is used and loose 0.25 mil (6.4 µm) HDPE "slip sheets" are placed between the probe and specimen. Haze is determined by ASTM D1003. Gloss is determined by ASTM D2457 at 45°.

Methods for Determining Modifier (Plasticizer) Content in Blend

The modifier content (weight percent basis) in a blend is determined using the CRYSTAF technique described below, unless the CRYSTAF soluble fraction for the unmodified polyethylene is greater than 30% in which case the NMR method described below is used. Both methods are solution methods. Both involve constructing a model based on a calibration curve (or set of calibration curves) of measured parameter(s) as a function of modifier concentration. The calibration blends are prepared using the same polymer and modifier as the blend(s) under investigation but at known modifier concentrations. This set of calibrants must number at least five, and include the neat polymer as well as at least one modifier concentration above the maximum for the blend(s) under investigation but not greater than 50 weight percent modifier. The blend(s) under investigation are analyzed under the same conditions as the calibrants, and the modifier content determined by applying the model.

Crystallization Analysis Fractionation (CRYSTAF)

The first method to determine the amount of modifier in a blend is fractionation using the Crystallization Analysis Fractionation (CRYSTAF) technique. This technique involves dissolving a sample in a solvent at high temperature, then cooling the solution slowly to cause fractionation of the sample based on solubility. For semi-crystalline samples, including blends, solubility depends primarily on crystallizability: portions of the sample that are more crystalline will precipitate out of solution at a higher temperature than portions of the sample that are less crystalline. The relative amount of sample in solution as a function of temperature is measured using an infrared (IR) detector to obtain the cumulative solubility distribution. The soluble fraction (SF) is defined as the IR signal at the lowest temperature divided by the IR signal when all the sample is dissolved at high temperature, and corresponds to the weight fraction of sample that has not crystallized.

In the case of modified ethylene polymers, the modifier is mostly or entirely amorphous and therefore contributes predominantly or exclusively to the SF. Thus, the SF will be larger for blends with higher modifier content. This relationship is exploited to determine the modifier content of a blend of known composition (polymer and modifier types) but unknown concentration. A calibration curve that describes the trend in SF as a function of modifier content is developed by making a series of blends of known concentration using the same polymer and modifier directly in the CRYSTAF vessels, and then running these blends under the same operating conditions as used for blends of unknown concentration. This series of a minimum of five calibrants must include the neat (unmodified) polymer, and at least one modifier concentrations above and one modifier concentration below the concentration of the unknown sample(s) in order to reliably apply the calibration curve to the unknown sample(s). Typically, a linear fit of the calibration points is found to provide a good representation of the SF as a function of modifier content (i.e., $R^2 > 0.9$); if necessary, a quadratic fit is used to improve the representation of the trend (i.e., $R^2 > 0.9$); if a quadratic fit is still insufficient then more calibrants are run to increase the density of points in the range of interest, and the fit is limited to a narrow enough range that a robust representation of the trend in the range of interest is achieved (i.e., $R^2 > 0.9$). This calibration curve is applied to the SF values measured for the blend(s) under investigation to calculate their respective fluid contents.

A typical CRYSTAF procedure is as follows. A commercial CRYSTAF 200 instrument (Polymer Char S.A., Valencia, Spain) with five stirred stainless steel vessels of 60 mL volume is used. Approximately 30 mg of sample are dissolved for 60 min at 160° C. in 30 mL of 1,2-dichlorobenzene stabilized with 2 g/4 L of butylated hydroxytoluene. The solution is equilibrated for 45 min at 100° C. The crystallization process is carried out by lowering the temperature of the vessels from 100° C. to 30° C. at a rate of 0.2° C./min. A dual wavelength infrared detector with a heated flow through cell maintained at 150° C. is used to measure the polymer concentration in solution at regular intervals during the crystallization cycle; the measuring wavelength is 3.5 µm and the reference wavelength is 3.6 µm.

If the soluble fraction for the unmodified polyethylene is greater than 30% when analyzed in 1,2-dichlorobenzene as described above, then phenyl ether should be used as the solvent. In this case, the temperatures must be adjusted in the CRYSTAF protocol: the dissolution temperature is 160° C., the equilibration temperature is 160° C., the temperature scan is 160° C. to 80° C., and the detector is maintained at 180° C.

Otherwise, the protocol is identical. If the soluble fraction of the unmodified polyethylene is still greater than 30%, then the NMR method should be used.

Nuclear Magnetic Resonance (NMR)

The second method to determine the amount of modifier in a blend is high-temperature solution-phase $^{13}C$ nuclear magnetic resonance (HTS-CNMR). The composition is determined using the reference spectra of the neat polymer and neat modifier, as well as spectra for a set of calibration blends (i.e., prepared from the neat polymer and modifier at known wt % modifier). The spectra are analyzed to determine a set of one or more diagnostic resonances or clusters of resonances that increase or decrease in strength monotonically with increasing modifier content. The corresponding peaks are integrated and their fractional contribution to the total integral calculated as a function of modifier content (weight %) to generate a set of calibration curves. A chemometrics model is developed using these calibration curves to provide a method to calculate the modifier content. The number of diagnostic resonances is chosen to allow the model to predict modifier content with a precision of 1 wt % or better over the calibration range. For a general description of chemometrics and how to develop a chemometrics model, see *Chemometric Techniques for Quantitative Analysis* by Richard Kramer (Marcel Dekker, 1998). The blend(s) of unknown concentration are then run following the same HTS-CNMR procedure as used for the calibrants, and the results analyzed according to the model to determine the weight % modifier.

A typical HTS-CNMR procedure is as follows. Samples are prepared in 1,1,2,2-tetrachloroethane-$d_2$, with chromium acetylacetonate [Cr(acac)$_3$] added as a relaxation agent to accelerate data acquisition. The Cr(acac)$_3$ concentration in the stock solvent is approximately 15 mg/ml. Sample concentrations are between 10 and 15 weight %. Free induction decays of 15,000 transients are accumulated at a temperature of 120° C. on a Varian UnityPlus 500 using a 10 mm broadband probe. Spectra are acquired with a 90° carbon excitation pulse, and inverse-gated WALTZ-16 proton decoupling. An acquisition time of approximately 1 second and recycle delay of 3.5 seconds are used to allow quantitative integration. Solvent choice and sample concentration may be adjusted to accommodate different solubility and to minimize spectral interference based on the specific composition of the blend. See *Carbon-13 NMR Spectroscopy: High-Resolution Methods and Applications in Organic Chemistry and Biochemistry*, 3rd edition, Eberhard Breitmaier and Wolfgang Voelter (VCH, 1990) for a general description of CNMR techniques.

EXAMPLES

The present invention, while not meant to be limited by, may be better understood by reference to the following examples and tables. The ethylene polymers and modifiers used in these examples are described in Tables 3-5.

Sample Preparation Methods

Samples were generated by blending the desired polyethylene composition, followed by fabrication into an article for testing.

Blending

Two methods were used to generate examples of modified blends. The first method, which is referred to as the Extruder Method, involved "dry blending" polymer granules or pellets with appropriate amounts of modifier and an additive package (including, for example, antioxidants) in a tumble blender to achieve a homogeneous mixing of components at the desired modifier and additive concentrations. This was followed by compounding and pelletizing the blend using an extruder at an appropriate extrusion temperature above the melting point of the polymer, typically in the range of 150 to 220° C. depending on the polymer.

The second method, which is referred to as the Brabender Method, involved mixing polymer pellets with the modifier in a heated C. W. Brabender Instruments Plasticorder to achieve a homogeneous melt at the desired modifier concentration. The Brabender was equipped with a Prep-Mixer head (approximately 200 cm$^3$ volume) and roller blades. The operating temperature was above the melting point of the polymer, but always in the range of 155 to 190° C. Polymer was first melted in the Brabender for 1 minute at 60 RPM. Modifier was then added slowly to prevent pooling in the melted polymer. The blend was then mixed for 5 minutes at 60 RPM under a nitrogen purge. The Brabender was opened and the melt removed from the mixing head and blades as quickly as possible, and allowed to solidify. For those blends later subjected to injection molding, the pieces of material from the Brabender were cut into smaller pieces using a guillotine, then ground into even smaller pieces using a Wiley Mill.

Injection Molding

Tensile bars (ASTM D638 Type IV) and flexure bars (ASTM D790) were molded using 20 ton Nissei injection molding equipment using the following conditions: barrel temperature in the range of 200-210° C.; nozzle temperature in the range of 210-220° C.; mold temperature was 40° C.; inject time was 30 sec; cooling time was 20 sec; and boost time was about 1 sec.

Compression Molding

The following is a description of a typical compression molding protocol. Material to be molded was placed between two sheets of poly(tetraflouroethylene) (PTFE)-coated aluminum foil onto a 0.125 inch (0.32 cm) thick chase, and pressed in a Carver press at 160° C. The material was allowed to melt for 5 minutes without pressure applied, then compressed for 5 minutes at a setting of 10 metric tons. It was then removed and immediately placed between water-cooled cold platens and pressed for another 5 minutes at a setting of 10 metric tons. The foil-sample-foil assembly was allowed to anneal for at least 40 hours at room temperature (approx. 23° C.), then quenched in dry ice prior to removing the sample from the foil to prevent deformation of the material when peeling off the foil. Tensile and flexure specimens were died out of the sample once it warmed to room temperature.

Blown-Film Process

Films with a target thickness of 1.0 mil (25.4 µm) were prepared on a Gloucester blown-film line. The process was run at 188 lbs/hour (85.3 kg/hr) in the tube stock mode, using a 2.5 in (6.4 cm) diameter extruder with temperatures ranging from 155 to 200° C. along the barrel to the die. Screw RPM were adjusted to maintain a fixed throughput. The die gap was 60 mils (1.5 mm), the film width was 23.5 inches (59.7 cm), and the layflat was 2.5 inches (6.4 cm).

Examples in Tables 6-8

Molded Articles

The addition of modifier improves the mechanical properties of molded polyethylene resins, primarily in terms of enhanced softness and flexibility. This is reflected in reduced Young's modulus, yield strength, and flexural modulus. It is also seen in trends toward lower stress at break and higher strain at break. Higher elongation facilitates the compliance of molded articles to deformation during either the conversion process or at the end-use.

Surprisingly, the resin is softened without loss of melting point. This is in contrast to the most common approach to enhancing softness, which is to synthesize resins of lower density by copolymerization of ethylene with comonomer, such as an alpha-olefin monomer like hexene or a polar monomer like vinyl acetate, which introduces short-chain branching in the polymer. Increased short-chain branching reduces the degree of crystallinity of the resin, as well as its melting point. As a result, the increased softness of lower density resins comes at the cost of a lower melting point, which translates into a lower heat-distortion temperature. This tradeoff limits the usability of common flexible polyethylene resins.

However, the melting behavior of polyethylene is not altered by the addition of the modifiers claimed in this invention, as revealed by minor changes in the onset and peak melting temperatures. Moreover, the degree of crystallinity of the polymer is reduced only modestly (by about 10% or less), as revealed by the heat of fusion ($\Delta H_f$) values for the blends vs neat resins after normalizing by the weight fraction of polymer in each blend. These conclusions are further supported by the crystallization behavior.

The use of modifiers to plasticize/soften polyethylene is therefore seen to be similar to the effect of lowering resin density by increasing the comonomer content, but does not have the limitation of also lowering the melting point and heat-distortion temperature, which is crucial for applications requiring maintenance of molded article dimensions at high temperature. Furthermore, the degree of softness can be adjusted at any step along the path from the PE resin plant to the end-product manufacturing site by adding more or less modifier to a single resin, in contrast to the need to handle large quantities of entirely separate resins at different densities.

The addition of modifier also improves melt flowability, as indicated by an increase in melt index (MI). The improvement of melt flowability is further evidenced by a decrease in zero-shear viscosity, $\eta_0$, without significant effect on the shear-thinning characteristics, as reflected in only small changes in the $\lambda$ and n rheological parameters. In this respect, the modifier can take the place of some or all of the "processing aids" such as fluorinated polymers which are commonly added to polyethylene resins to improve their processibility.

This improvement in melt flowability is not associated with a decrease in polymer molecular weight, which is a common approach to improve processibility, wherein a higher MI resin is used to increase processing speeds and/or lower processing energy requirements. It is also a departure from other traditional approaches to achieve low melt viscosity, such as broadening the molecular weight distribution of the resin, using a bimodal composition distribution resin, or introducing long-chain branching to the resin. All these approaches have some merits, but the overall balance of melt processibility and solid-state properties is less than desired.

The present invention provides a way to alter the melt rheology in such a way as to improve melt flowability without changing the underlying molecular weight, polydispersity, and or architecture of the polymer. The improvement of melt flowability usually benefits fabrication processes (for example, fiber spinning, film casting, extrusion, and injection molding) in terms of better draw-down, lower extruder torque, thin wall injection, and faster cycle time. Moreover, the retention of molecular weight will translate into improved melt strength relative to the same MI material without modifier, which is important for fabrication processes such as film blowing, film casting, and fiber spinning.

Figure 2:
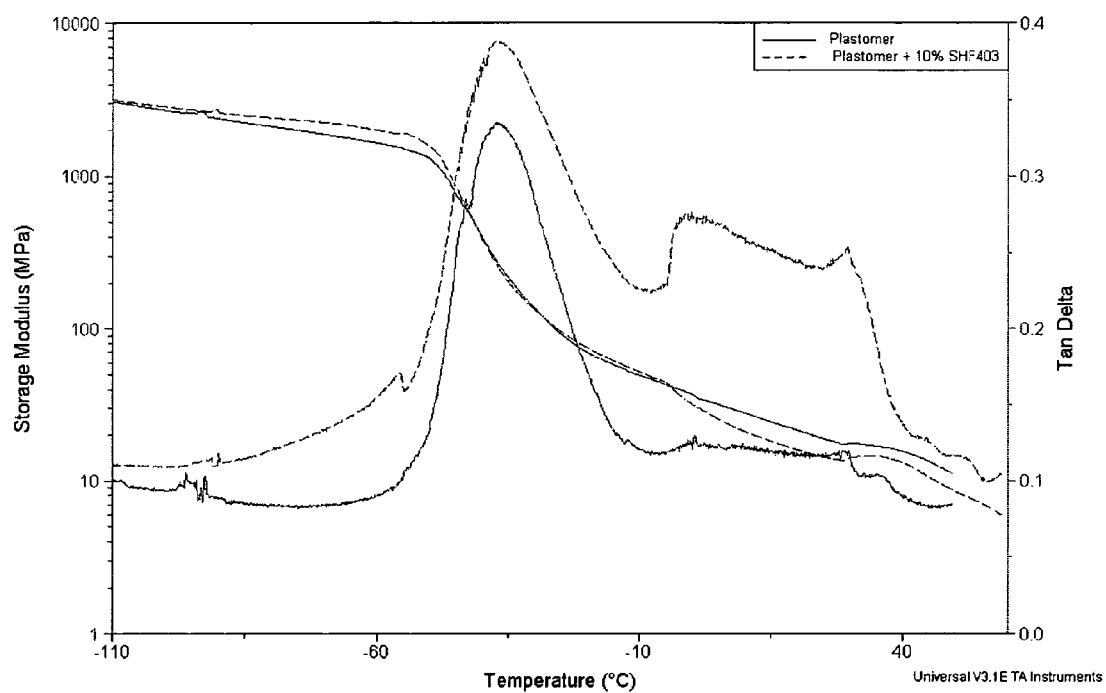
FIG. 2 is a plot of DMTA results for Plastomer modified with a polyalphaolefin, specifically for Plastomer, neat and modified with 10% SHF-403 (now sold as ExxonMobil SpectraSyn 40).

Improvement in mechanical properties upon plasticization is also revealed by the DMTA results. In general, the addition of modifier/modifier depresses the low-temperature (−30° C.) storage modulus of polyethylene resins. A lower storage modulus (or "elastic modulus") at any particular temperature indicates better flexibility for the end-use at that particular temperature. Modifiers of relatively low molecular weight (<500 g/mole) and relatively high pour points (>−10° C.) tend to have a null or opposite effect, that is to modestly increase the low-temperature storage modulus. The ambient temperature (25° C.) storage modulus data generally mimic the improved softness revealed by the flexural modulus results. Plasticization also improves the low-temperature relaxation behavior of polyethylene in at least three ways: 1) by introducing a new LTRM, as in the case for HDPE shown in Table 6e and FIG. 1; 2) by shifting an existing LTRM to a lower temperature, as is the case for EVA shown in Table 7e; or 3) by enhancing the magnitude of an existing LTRM, as is the case for the plastomer shown in Table 8e and FIG. 2.

Polymers exhibiting such advantageous changes in the LTRM behavior without compromising the melting characteristics are very desirable and can provide improved toughness, including better impact resistance, particularly below 20° C. and more importantly below freezing temperature, by improving the low-temperature energy dissipation capabilities while maintaining the ability for high temperature usage. The modified polyethylenes of the present invention exhibit this improved toughness as reflected, for example, in improved notched Izod impact resistance data for HDPE at −18° C. Traditional methods to introduce a LTRM, or to amplify an existing LTRM, include the incorporation of comonomers as in the case for linear low-density polyethylene or plastomers; however, doing so also depresses the melting and crystallization temperatures of the polymer. The present invention provides a similar advantage but does not significantly alter the melting temperature and crystallization temperature of ethylene polymers. Thus the temperature window for usefulness of polyethylene is expanded by this modification technology.

Examples in Tables 9-10

Blown Films

Films were fabricated using a film-blowing processing from two different linear low density polyethylene resins in both unplasticized and plasticized versions, where the modifier was 5 wt % PAO (SHF-101, also known as SpectraSyn 10). The modified versions show much improved optical properties (lower haze and higher gloss) with slightly improved mechanical properties that correspond to a softening of the film (for example, lower flexural modulus). Dart drop and puncture properties are essentially unchanged. Tear properties, as measured by Elmendorf tear, are improved in the machine direction (MD) without significant change in the transverse direction (TD), resulting in a decrease in the ratio of TD to MD values, or more uniformity. Again, processibility is improved by modification, as indicated by an increase in MI without changing the molecular weight, molecular weight distribution, or architecture of the polymer. Polyethylene resins that yield such improved properties, including more uniform tear properties, offer advantages in many film applications; for example, food packaging, stationery cover, tape, medical and electronic packaging.

Examples in Tables 11-13

Molded Articles from HDPE

The present invention is particularly successful at softening high density polyethylene without loss of its high-temperature capabilities. This is demonstrated even using very low amounts of modifier, such as 2 wt % PAO of different molecular weight. Such modification lowers the flexural modulus, lowers the tensile yield strength, and generally increases the elongation to break. It also improves the overall toughness of the resin, as reflected in significantly better environmental stress crack resistance (ESCR) after modification; in some cases the improvement can reach a two-fold increase in ESCR. At a given modifier concentration, ESCR increases with increasing PAO molecular weight. Improved toughness is also reflected in higher tensile impact strength; however, the extent of this improvement decreases as PAO molecular weight and/or resin density increase, to the point that it is a null or detrimental effect for combinations of the highest PAO molecular weight and highest resin density.

Again, processability is improved by modification, as indicated by an increase in MI without changing the molecular weight, molecular weight distribution, or architecture of the polymer. All this modification of physical properties is accomplished without a discernable change in melting point. Moreover, the isothermal crystallization rate decreases, which should result in improved clarity of the resin.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

Further, all documents cited herein, including testing procedures, are herein fully incorporated by reference for all jurisdictions in which such incorporation is permitted to the extent the are not inconsistent with this specification, provided however that all priority documents (except for U.S. Ser. No. 60/649,266) are NOT incorporated by reference herein.

TABLE 3

List of Polymers used in Examples

| Polymer | Description | Source |
|---|---|---|
| HDPE-1 | High Density Polyethylene; MI ~6.7 dg/min, density ~0.952 g/cm$^3$, $T_m$ ~132° C., | HD 6706 ExxonMobil Chemical Co. Baytown TX |
| HDPE-2 | High Density Polyethylene (ethylene-hexene copolymer); MI (21.6 kg) ~10 dg/min, density ~0.949 g/cm$^3$ | Paxon ™ BA50-100 ExxonMobil Chemical Co. Baytown TX |
| HDPE-3 | High Density Polyethylene (ethylene-hexene copolymer); MI ~0.3 dg/min, density ~0.954 g/cm$^3$ | Paxon ™ AL55-003 ExxonMobil Chemical Co. Baytown TX |
| HDPE-4 | High Density Polyethylene (homopolymer); MI ~0.7 dg/min, density ~0.963 g/cm$^3$ | Paxon ™ AD60-007 ExxonMobil Chemical Co. Baytown TX |
| LLDPE-1 | Linear Low-Density Polyethylene (hexene comonomer); MI ~1 dg/min, density ~0.917 g/cm$^3$, $T_m$ ~124° C. | LL3001 ExxonMobil Chemical Co. Baytown TX |
| LLDPE-2 | Linear Low-Density Polyethylene (hexene comonomer); MI ~0.5 dg/min, density ~0.921 g/cm$^3$, $T_m$ ~125° C. | LL3105 ExxonMobil Chemical Co. Baytown TX |
| EVA | Ethylene-Vinyl Acetate Copolymer; MI ~3.5 dg/min, density ~0.933 g/cm$^3$, $T_m$ ~87° C.; vinyl acetate content ~15 wt % | Escorene ™ Ultra LD 713 ExxonMobil Chemical Co. Baytown TX |
| Plastomer | Ethylene-Butene Copolymer; MI ~0.8 dg/min, density ~0.880 g/cm$^3$, $T_m$ ~60° C., | Exact ™ 4033 ExxonMobil Chemical Co. Baytown TX |

TABLE 4a

List of Inventive Modifiers used in Examples

| Fluid | Description | Source |
|---|---|---|
| SHF-101 | PAO liquid (now sold as SpectraSyn 10) | ExxonMobil Chemical Co. Baytown TX |
| SHF-403 | PAO liquid (now sold as SpectraSyn 40 | ExxonMobil Chemical Co. Baytown TX |
| SuperSyn 2150 | PAO liquid (now sold as SpectraSyn Ultra 150) | ExxonMobil Chemical Co. Baytown TX |
| VHVI-8 | Group III basestock | PetroCanada |
| GTL6/MBS | Group III basestock | ExxonMobil Chemical Co. Baytown TX |
| GTL14/HBS | Group III basestock | ExxonMobil Chemical Co. Baytown TX |
| Lucant HC-10 | Blend of decene oligomer with an ethylene/propylene copolymer (CAS # 9010-79-1) where it is believed that the decene oligomer has a kinematic viscosity at 100° C. of about 6 cSt ± 2 cSt, and that the ethylene/propylene polymer has an $M_w$ well below 10,000 g/mol. | Mitsui Chemicals America |

TABLE 4b

Properties of Inventive Modifiers in Examples

| Fluid | KV, 40° C. (cSt) | KV, 100° C. (cSt) | VI (—) | pour point (° C.) | $M_n$ (g/mole) | $C_n$ | APHA color | specific gravity (15.6° C./15.6° C.) | flash point (° C.) |
|---|---|---|---|---|---|---|---|---|---|
| SHF-101 | 66 | 10 | 137 | −48 | 720[#] | 51 | 10 | 0.835 | 266 |
| SHF-403 | 396 | 39 | 147 | −36 | 1,700[+] | 120 | 10 | 0.850 | 281 |
| SuperSyn 2150 | 1,500 | 150 | 218 | −33 | 3,700[+] | 260 | 10 | 0.850 | >265 |
| VHVI-8 | 50 | 8 | 129 | −12 | 560 | 40 | 10 | 0.850 | 248 |
| GTL6/MBS | 30 | 6 | 156 | −18 | 510* | 36 | 10 | 0.823 | 232 |
| GTL14/HBS | 95 | 14 | 155 | −24 | 750* | 53 | 10 | 0.834 | 275 |
| Lucant HC-10 | 60 | 10 | 150 | −53 | 590 | 42 | 5 | 0.826 | 250 |

$M_n$ reported by manufacturer, except:
*estimated by freezing point depression ("Lange's Handbook of Chemistry," 15th Edition, McGrawHill),
[#]measured by GC,
[+]measured by GPC.

TABLE 5a

List of Comparative Modifiers used in Examples

| Fluid | Description | Source |
|---|---|---|
| Rudol | white mineral oil | Crompton |
| CORE 2500 | Group I basestock | ExxonMobil Chemical Co. Baytown TX |
| EHC 110 | Group II basestock | ExxonMobil Chemical Co. Baytown TX |

TABLE 5b

Properties of Comparative Modifiers in Examples

| Fluid | KV, 40° C. (cSt) | KV, 100° C. (cSt) | VI (—) | pour point (° C.) | $M_n$ (g/mole) | $C_n$ | APHA color | specific gravity (15.6° C./15.6° C.) | flash point (° C.) |
|---|---|---|---|---|---|---|---|---|---|
| Rudol | 29 | 5 | 103 | −24 | 400 | 28 | 5 | 0.861 | 198 |
| CORE 2500 | 490 | 32 | 95 | −6 | 800* | 57 | >500 | 0.902 | 294 |
| EHC 110 | 99 | 11 | 95 | −12 | 500* | 36 | 250 | 0.875 | 230 |

$M_n$ reported by manufacturer, except:
*estimated by freezing point depression ("Lange's Handbook of Chemistry," 15th Edition, McGrawHill).

TABLE 6a

Tensile properties for plasticized HDPE-1.

| Modifier type | Modifier content (wt %) | Young's Modulus (kpsi) | Yield Stress (kpsi) | Yield Strain (%) | Energy to Yield (ft-lbf) | Break stress (kpsi) | Break Strain (%) | Energy to Break (ft-lbf) |
|---|---|---|---|---|---|---|---|---|
| — | 0 | 72.3 | 3.59 | 14.0 | 16.7 | 2.98 | 860 | 73.4 |
| Rudol | 10 | 38.0 | 2.60 | 25.1 | 22.2 | 2.73 | 1060 | 88.6 |
| CORE 2500 | 10 | 42.7 | 2.65 | 23.6 | 21.4 | 2.52 | 920 | 67.8 |
| SuperSyn 2150 | 5 | 63.4 | 3.06 | 16.8 | 17.5 | 1.36 | 520 | 34.8 |
| SuperSyn 2150 | 10 | 51.9 | 2.68 | 17.6 | 16.0 | 1.48 | 350 | 20.4 |
| GTL6/MBS | 10 | 38.5 | 2.61 | 23.6 | 20.8 | 2.45 | 970 | 70.5 |

(1 psi = 0.006895 MPa; 1 ft-lbf = 1.356 J)

TABLE 6b

Flexural and Notched Izod impact properties for modified HDPE-1.

| Modifier type | Modifier content (wt %) | 1% Secant Modulus (kpsi) | 2% Secant Modulus (kpsi) | −18° C. NI impact resistance (ft-lb/in) |
|---|---|---|---|---|
| — | 0 | 110.3 | 93.1 | 0.9 |
| Rudol | 10 | 53.4 | 46.0 | 1.2 |
| CORE 2500 | 10 | 57.2 | 48.6 | 1.0 |
| SuperSyn 2150 | 5 | 80.5 | 67.6 | 0.9 |
| SuperSyn 2150 | 10 | 61.5 | 52.4 | 1.1* |
| GTL6/MBS | 10 | 54.6 | 46.8 | 1.3 |

*Some NI failures were incomplete breaks. (1 psi = 0.006895 MPa; 1 ft-lbf = 1.356 J)

TABLE 6c

Rheological Properties for Modified HDPE-1.

| Modifier type | Modifier content (wt %) | $\eta_0$ (Pa-s) | $\lambda$ (s) | n | MI (g/10 min) |
|---|---|---|---|---|---|
| — | 0 | 1414 | 0.0194 | 0.433 | 6.7 |
| Rudol | 10 | 1020 | 0.0144 | 0.441 | 9.6 |
| CORE 2500 | 10 | 985 | 0.0127 | 0.408 | 9.8 |
| SuperSyn 2150 | 5 | 1322 | 0.0209 | 0.476 | 8.0 |
| SuperSyn 2150 | 10 | 1252 | 0.0288 | 0.527 | 10.7 |
| GTL6/MBS | 10 | 992 | 0.0146 | 0.453 | 9.6 |

TABLE 6d

DSC Properties for Modified HDPE-1.

| | | First Melting | | | Crystallization | | Second Melting | | |
|---|---|---|---|---|---|---|---|---|---|
| Modifier type | Modifier content (wt %) | $T_m$ at onset (° C.) | $T_m$ at peak (° C.) | $\Delta H_f$ (J/g) | $T_c$ at onset (° C.) | $T_c$ at peak (° C.) | $T_m$ at onset (° C.) | $T_m$ at peak (° C.) | $\Delta H_f$ (J/g) |
| - - - | 0 | 122 | 130 | 191 | 117 | 115 | 123 | 131 | 201 |
| Rudol | 10 | 121 | 129 | 160 | 116 | 113 | 121 | 129 | 170 |
| CORE 2500 | 10 | 121 | 131 | 154 | 117 | 112 | 123 | 132 | 165 |
| SuperSyn 2150 | 5 | 123 | 132 | 180 | 118 | 114 | 124 | 132 | 194 |
| SuperSyn 2150 | 10 | 123 | 132 | 152 | 118 | 113 | 123 | 133 | 166 |
| GTL6/MBS | 10 | 121 | 131 | 165 | 116 | 112 | 122 | 131 | 181 |

TABLE 6e

DMTA Properties for Modified HDPE-1.

| Modifier type | Modifier content (wt %) | $T_{LTRM}$ at onset (° C.) | $T_{LTRM}$ at peak (° C.) | LTRM Peak Area (MPa-K) | E' at −30° C. (MPa) | E' at 25° C. (MPa) |
|---|---|---|---|---|---|---|
| — | 0 | * | * | * | 1837 | 1064 |
| Rudol | 10 | −74 | −44 | 0.4 | 1323 | 593 |
| CORE 2500 | 10 | −65 | −40 | 0.4 | 1482 | 575 |
| SuperSyn 2150 | 5 | −50 | −41 | 0.1 | 1661 | 838 |
| SuperSyn 2150 | 10 | −53 | −34 | 0.1 | 1495 | 693 |
| GTL6/MBS | 10 | −96 | −69 | 0.4 | 1234 | 575 |

* No LTRM peak below 20° C.

TABLE 7a

Tensile Properties for Modified EVA.

| Modifier type | Modifier content (wt %) | Young's Modulus (kpsi) | Yield Stress* (psi) | Yield Strain* (%) | Break stress (kpsi) | Break Strain (%) | Energy to Break (ft-lbf) |
|---|---|---|---|---|---|---|---|
| — | 0 | 6.78 | 713 | 22 | 1.86 | 1150 | 48.2 |
| Rudol | 10 | 4.91 | 532 | 22 | 1.22 | 1020 | 29.7 |

TABLE 7a-continued

Tensile Properties for Modified EVA.

| Modifier type | Modifier content (wt %) | Young's Modulus (kpsi) | Yield Stress* (psi) | Yield Strain* (%) | Break stress (kpsi) | Break Strain (%) | Energy to Break (ft-lbf) |
|---|---|---|---|---|---|---|---|
| EHC-110 | 10 | 4.31 | 490 | 22 | 1.47 | 1280 | 40.3 |
| GTL14/HBS | 10 | 4.50 | 599 | 24 | 1.72 | 1270 | 43.1 |
| Lucant HC-10 | 10 | 4.83 | 544 | 22 | 1.58 | 1290 | 43.1 |

*Yield point determined using 10% off-set definition. (1 psi = 0.006895 MPa; 1 ft-lbf = 1.356 J)

TABLE 7b

Flexural properties for Modified EVA.

| Modifier type | modifier content (wt %) | 1% Secant Modulus (kpsi) | 2% Secant Modulus (kpsi) |
|---|---|---|---|
| — | 0 | 8.25 | 8.13 |
| Rudol | 10 | 5.79 | 5.69 |
| EHC-110 | 10 | 5.95 | 5.83 |
| GTL14/HBS | 10 | 5.97 | 5.85 |
| Lucant HC-10 | 10 | 5.91 | 5.80 |

(1 psi = 0.006895 MPa; 1 ft-lbf = 1.356 J)

TABLE 7c

Rheological Properties for Modified EVA.

| Modifier type | Modifier content (wt %) | $\eta_0$ (Pa-s) | $\lambda$ (s) | n | MI (g/10 min) |
|---|---|---|---|---|---|
| — | 0 | 4700 | 0.468 | 0.387 | 3.3 |
| Rudol | 10 | 2061 | 0.218 | 0.387 | 9.2 |
| EHC-110 | 10 | 2422 | 0.269 | 0.394 | 9.2 |
| GTL14/HBS | 10 | 2641 | 0.271 | 0.386 | 8.7 |
| Lucant HC-10 | 10 | 2491 | 0.272 | 0.391 | 9.2 |

TABLE 7d

DSC Properties for Modified EVA.

| | | First Melting | | | Crystallization | | Second Melting | | |
|---|---|---|---|---|---|---|---|---|---|
| Modifier type | Modifier content (wt %) | $T_m$ at onset (° C.) | $T_m$ at peak (° C.) | $\Delta H_f$ (J/g) | $T_c$ at onset (° C.) | $T_c$ at peak (° C.) | $T_m$ at onset (° C.) | $T_m$ at peak (° C.) | $\Delta H_f$ (J/g) |
| — | 0 | 69 | 89 | 87 | 76 | 72 | 71 | 89 | 84 |
| Rudol | 10 | 66 | 86 | 71 | 75 | 71 | 67 | 87 | 65 |
| EHC-110 | 10 | 68 | 88 | 76 | 74 | 69 | 69 | 89 | 73 |
| GTL14/HBS | 10 | 69 | 89 | 73 | 76 | 72 | 69 | 90 | 73 |
| Lucant HC-10 | 10 | 68 | 89 | 77 | 74 | 69 | 69 | 89 | 76 |

TABLE 7e

DMTA properties for Modified EVA.

| Modifier type | Modifier content (wt %) | $T_{LTRM}$ at onset (° C.) | $T_{LTRM}$ at peak (° C.) | LTRM Peak Area (MPa-K) | E' at −30° C. (MPa) | E' at 25° C. (MPa) |
|---|---|---|---|---|---|---|
| — | 0 | −42 | −19 | 3.1 | 1305 | 30 |
| Rudol | 10 | −53 | −27 | 4.3 | 599 | 21 |
| EHC-110 | 10 | −51 | −25 | 2.9 | 775 | 24 |
| GTL14/HBS | 10 | −44 | −19 | 1.9 | 602 | 32 |
| Lucant HC-10 | 10 | −47 | −20 | 2.7 | 752 | 52 |

TABLE 8a

Tensile Properties for Modified Plastomer (compression molded).

| Modifier type | Modifier content (wt %) | Young's Modulus (kpsi) | Yield Stress* (psi) | Yield Strain* (%) | Break stress (kpsi) | Break Strain (%) | Energy to Break (ft-lbf) |
|---|---|---|---|---|---|---|---|
| — | 0 | 1.85 | 358 | 30 | 3.62 | 1860 | 103.1 |
| Rudol | 10 | 1.36 | 301 | 33 | (NB) | (NB) | (NB) |

TABLE 8a-continued

Tensile Properties for Modified Plastomer (compression molded).

| Modifier type | Modifier content (wt %) | Young's Modulus (kpsi) | Yield Stress* (psi) | Yield Strain* (%) | Break stress (kpsi) | Break Strain (%) | Energy to Break (ft-lbf) |
|---|---|---|---|---|---|---|---|
| SHF 403 | 10 | 1.42 | 310 | 33 | 2.81 | 1880 | 81.1 |
| VHVI-8 | 10 | 1.39 | 298 | 32 | (NB) | (NB) | (NB) |

*Yield point determined using 10% off-set definition.
(NB) Majority of specimens did not break before maximum strain limit reached (~2000%).
(1 psi = 0.006895 MPa; 1 ft-lbf = 1.356 J)

TABLE 8b

Flexural properties for Modified Plastomer (compression molded).

| Modifier type | Modifier content (wt %) | 1% Secant Modulus (kpsi) | 2% Secant Modulus (kpsi) |
|---|---|---|---|
| — | 0 | 3.11 | 2.94 |
| Rudol | 10 | 2.29 | 2.22 |
| SHF 403 | 10 | 2.48 | 2.39 |
| VHVI-8 | 10 | 2.39 | 2.30 |

(1 psi = 0.006895 MPa; 1 ft-lbf = 1.356 J)

TABLE 8c

Rheological Properties for Modified Plastomer (compression molded).

| Modifier type | Modifier content (wt %) | MI (g/10 min) |
|---|---|---|
| — | 0 | 0.7 |
| Rudol | 10 | 0.4 |
| SHF 403 | 10 | 0.5 |
| VHVI-8 | 10 | 0.3 |

TABLE 8d

DSC Properties for Modified Plastomer (compression molded).

| | | First Melting | | | Crystallization | | Second Melting | | |
|---|---|---|---|---|---|---|---|---|---|
| Modifier type | Modifier content (wt %) | $T_m$ at onset (°C.) | $T_m$ at peak (°C.) | $\Delta H_f$ (J/g) | $T_c$ at onset (°C.) | $T_c$ at peak (°C.) | $T_m$ at onset (°C.) | $T_m$ at peak (°C.) | $\Delta H_f$ (J/g) |
| — | 0 | 39 | 51 | 53 | 50 | 48 | 10 | 62 | 53 |
| Rudol | 10 | 22 | 63 | 49 | 51 | 47 | 9 | 61 | 45 |
| SHF 403 | 10 | 36 | 50 | 52 | 56 | 48 | 13 | 61 | 47 |
| VHVI-8 | 10 | 36 | 47 | 44 | 49 | 46 | 11 | 62 | 40 |

TABLE 8e

DMTA Properties for Modified Plastomer (compression molded).

| Modifier type | Modifier content (wt %) | $T_{LTRM}$ at onset (°C.) | $T_{LTRM}$ at peak (°C.) | LTRM Peak Area (MPa-K) | E' at −30° C. (MPa) | E' at 25° C. (MPa) |
|---|---|---|---|---|---|---|
| — | 0 | −51 | −37 | 1.7 | 130 | 19 |
| Rudol | 10 | −59 | −43 | 2.4 | 97 | 16 |
| SHF 403 | 10 | −51 | −37 | 1.6 | 130 | 14 |
| VHVI-8 | 10 | −57 | −43 | 1.6 | 113 | 12 |

TABLE 9

| Blown Film Properties of Modified LLDPE-1. | | | |
|---|---|---|---|
| Concentration of SHF-101 (wt %) | | 0 | 5 |
| LLDPE-1 Properties | | | |
| MI (dg/min) | ASTM D1238 | 1.1 | 1.4 |
| Density (g/cm$^3$) | ASTM D1505 | 0.9197 | 0.9162 |
| Gauge Properties | | | |
| Average (mil) | | 1.01 | 1.03 |
| Low/High (mil) | | 0.95/1.07 | 0.98/1.09 |
| Optical Properties | | | |
| Haze (%) | ASTM D1003 | 20.6 | 12.3 |
| Gloss @ 45° | ASTM D2457 | 33 | 51 |
| Toughness Properties | | | |
| Dart Drop Impact Resistance, F$_{50}$ (g/mil) | ASTM D1709 | 125 | 121 |
| Puncture Peak Force (lbf/mil) | ASTM D5748 | 8.4 | 7.1 |
| Puncture Energy to Break (in-lbf/mil) | ASTM D5748 | 23.3 | 20.8 |
| Mechanical Properties | | MD TD | MD TD |
| Tensile Strength at Yield (kpsi) | ASTM D882 | 1.43  1.56 | 1.23  1.31 |
| Ultimate Tensile Strength (kpsi) | ASTM D882 | 8.34  6.29 | 7.26  5.27 |
| Elongation at Yield (%) | ASTM D882 | 6.5   5.5 | 6.7   6.0 |
| Elongation at Break (%) | ASTM D882 | 537   732 | 567   746 |
| Flexural Modulus, 1% Secant (kpsi) | ASTM D882 | 28.3  34.7 | 21.1  27.5 |
| Elmendorf Tear (g/mil) | ASTM D1922 | 249   770 | 273   739 |

(1 mil = 25.4 μm; 1 kpsi = 6.895 MPa; 1 in-lb = 0.1130 J; 1 g/mil = 0.386 kJ/m$^2$; 1 lbf/mil = 174 kJ/m$^2$; 1 in-lbf/mil = 4.45 kJ/m)

TABLE 10

| Blown Film Properties of Modified LLDPE-2. | | | |
|---|---|---|---|
| Concentration of SHF-101 (wt %) | | 0 | 5 |
| LLDPE-2 Properties | | | |
| MI (dg/min) | ASTM D1238 | 0.5 | 0.6 |
| Density (g/cm$^3$) | ASTM D1505 | 0.9229 | 0.9188 |
| Gauge Properties | | | |
| Average (mil) | | 1.04 | 1.01 |
| Low/High (mil) | | 0.95/1.11 | 0.94/1.07 |
| Optical Properties | | | |
| Haze (%) | ASTM D1003 | 10.2 | 5.9 |
| Gloss @ 45° | ASTM D2457 | 53 | 72 |
| Toughness Properties | | | |
| Dart Drop Impact Resistance, F$_{50}$ (g/mil) | ASTM D1709 | 127 | 133 |
| Puncture Peak Force (lbf/mil) | ASTM D5748 | 11.1 | 10.0 |
| Puncture Energy to Break (in-lbf/mil) | ASTM D5748 | 32.6 | 29.9 |
| Mechanical Properties | | MD TD | MD TD |
| Tensile Strength at Yield (kpsi) | ASTM D882 | 1.55  1.78 | 1.42  1.51 |
| Ultimate Tensile Strength (kpsi) | ASTM D882 | 10.11 7.87 | 10.53 7.20 |
| Elongation at Yield (%) | ASTM D882 | 5.9   5.2 | 6.7   6.0 |
| Elongation at Break (%) | ASTM D882 | 409   728 | 450   761 |
| Flexural Modulus, 1% Secant (kpsi) | ASTM D882 | 32.3  41.1 | 25.5  31.8 |
| Elmendorf Tear (g/mil) | ASTM D1922 | 222   945 | 364   988 |

(1 mil = 25.4 μm; 1 kpsi = 6.895 MPa; 1 in-lb = 0.1130 J; 1 g/mil = 0.386 kJ/m$^2$; 1 lbf/mil = 174 kJ/m$^2$; 1 in-lbf/mil = 4.45 kJ/m)

TABLE 11

Mechanical Properties of Modified HDPE-2.

| Modifier | type<br>wt % | —<br>0 | SHF-101<br>2 | SHF-403<br>2 | SuperSyn 2150<br>2 |
|---|---|---|---|---|---|
| HDPE-2 Properties | | | | | |
| MI (dg/min), high-load (21.6 kg) | ASTM D1238 | 8.4 | 10.3 | 10.1 | 10.6 |
| Thermal Properties | | | | | |
| DSC Melting Point (° C.) | peak | 133 | 133 | 135 | 134 |
| Isothermal Crystallization Half-time (min) | 125° C. | 6.3 | 11.6 | 7.7 | 7.6 |
| Mechanical Properties | | | | | |
| Tensile Yield Strength (kpsi) | ASTM D638 | 3.80 | 3.45 | 3.61 | 3.58 |
| Elongation at Break (%) | ASTM D638 | 100 | 220 | 350 | 580 |
| Flexural Tangent Modulus (kpsi) | ASTM D790 | 175 | 154 | 161 | 151 |
| Tensile Impact Strength (psi) | ASTM D1822 | 101 | 138 | 115 | 114 |
| ESCR $F_{50}$ (hours) | ASTM D1693 | 136 | 145 | 175 | 303 |

(1 psi = 0.006895 MPa)

TABLE 12

Mechanical Properties of Modified HDPE-3.

| Modified | type<br>wt % | —<br>0 | SHF-101<br>2 | SHF-403<br>2 | SuperSyn 2150<br>2 |
|---|---|---|---|---|---|
| HDPE-3 Properties | | | | | |
| MI (dg/min), high-load (21.6 kg) | ASTM D1238 | 17.7 | 19.4 | 20.3 | 21.2 |
| Thermal Properties | | | | | |
| DSC Melting Point (° C.) | peak | 132 | 133 | 132 | 134 |
| Isothermal Crystallization Half-time (min) | 125° C. | 14.3 | 33.8 | 33.4 | 21.6 |
| Mechanical Properties | | | | | |
| Tensile Yield Strength (kpsi) | ASTM D638 | 3.97 | 3.68 | 3.76 | 3.81 |
| Elongation at Break (%) | ASTM D638 | 1430 | 1740 | 1660 | 1400 |
| Flexural Tangent Modulus (kpsi) | ASTM D790 | 201 | 175 | 182 | 179 |
| Tensile Impact Strength (psi) | ASTM D1822 | 95 | 110 | 101 | 86 |
| ESCR $F_{50}$ (hours) | ASTM D1693 | 129 | 140 | 142 | 161 |

(1 psi = 0.006895 MPa)

TABLE 13

Mechanical Properties of Modified HDPE-4.

| Modifier | type<br>wt % | —<br>0 | SHF-101<br>2 | SHF-403<br>2 | SuperSyn 2150<br>2 |
|---|---|---|---|---|---|
| HDPE-4 Properties | | | | | |
| MI (dg/min), high-load (21.6 kg) | ASTM D1238 | 49.0 | 54.4 | 54.4 | 52.2 |
| Thermal Properties | | | | | |
| DSC Melting Point (° C.) | peak | 138 | 138 | 137 | 136 |
| Isothermal Crystallization Half-time (min) | 125° C. | 1.0 | 1.2 | 1.2 | 1.2 |
| Mechanical Properties | | | | | |
| Tensile Yield Strength (kpsi) | ASTM D638 | 4.64 | 4.42 | 4.40 | 4.41 |
| Elongation at Break (%) | ASTM D638 | 100 | 690 | 350 | 550 |
| Flexural Tangent Modulus (kpsi) | ASTM D790 | 270 | 222 | 232 | 224 |
| Tensile Impact Strength (psi) | ASTM D1822 | 56 | 61 | 57 | 51 |
| ESCR $F_{50}$ (hours) | ASTM D1693 | 7 | 9 | 8 | 10 |

(1 psi = 0.006895 MPa)

The invention claimed is:

1. A composition comprising more than 25 weight % (based on the weight of the composition) of one or more ethylene polymers having an $M_w$ of 20,000 g/mole or more and at least 0.1 weight % of a liquid modifier comprising $C_{20}$ to $C_{1500}$ paraffins where the modifier has:
   1) a viscosity index of 120 or more, and
   2) an kinematic viscosity of 3 to 3000 cSt at 100° C., and
   3) a pour point of −10° C. or less, and
   4) a flash point of 200° C. or more, and
   5) a glass transition temperature that cannot be determined or if it can be determined is less than less than −10° C., and
   6) has no distinct melting point above 0° C.;
   and wherein the modifier is a compound comprising carbon and hydrogen that contains less than 5 weight % of functional groups selected from hydroxide, aryls, substituted aryls, halogens, alkoxys, carboxylates, esters, acrylates, oxygen, nitrogen, and carboxyl, based upon the weight of the modifier, and wherein the composition comprises less than 5 weight % propylene polymer.

2. The composition of claim 1 wherein the modifier contains less than 50 weight % $C_4$ olefin(s), based upon the weight of the modifier.

3. The composition of claim 2 wherein the modifier contains less than 50 weight % isobutylene groups.

4. The composition of claim 1 wherein the modifier is present at 1 weight % or more.

5. The composition of claim 1 wherein the composition comprises less than 1 weight % propylene polymer.

6. The composition of claim 1 wherein the composition comprises less than 40 weight % of a polymer or oligomer of $C_4$ olefin(s).

7. The composition of claim 1 wherein the modifier is not an ethylene/alpha-olefin copolymer or co-oligomer.

8. The composition of claim 1 wherein the composition comprises 25 wt % or less of a propylene polymer, based upon the weight of the composition.

9. The composition of claim 1 wherein the modifier comprises oligomers of $C_5$ to $C_{14}$ olefins.

10. The composition of claim 9 wherein the modifier comprises oligomers of 1-pentene, 1-hexene, 1-heptene, 1-octene, 1-nonene, 1-decene, 1-undodecene and or 1-dodecene.

11. The composition of claim 1 wherein the modifier comprises oligomers or polymers of decene having a carbon number of 20 to 1500.

12. The composition of claim 11 wherein the modifier comprises oligomers of decene having a carbon number of 35-400.

13. The composition of claim 1 wherein the modifier comprises oligomers of octene, decene, and/or dodecene having a carbon number of 35-400.

14. The composition of claim 1, wherein the modifier comprises a mixture of linear and branched paraffinic hydrocarbon composition having a number-average molecular weight of 300 to 10,000 g/mole; having a branched paraffin:normal paraffin ratio ranging from about 0.5:1 to 9:1; having less than 10% sidechains with 4 or more carbons and at least 15% sidechains with 1 or 2 carbons; and where the modifier comprises less than 2 weight % cyclic paraffins.

15. The composition of claim 1, wherein the modifier comprises a paraffinic composition derived from Fischer-Tropsch hydrocarbons and/or waxes, including wax isomerate lubricant oil basestocks and Gas-to-Liquids basestocks, having a kinematic viscosity at 100° C. of about 3 cSt to about 500 cSt.

16. The composition of claim 1, wherein the modifier comprises a mineral oil having a saturates level of 90% or more and a sulfur content of 0.03% or less.

17. The composition of claim 1 wherein the modifier has a kinematic viscosity of 3 cSt to 300 cSt at 100° C.

18. The composition of claim 1 wherein the modifier has a kinematic viscosity of 6 to 300 cSt at 100° C.

19. The composition of claim 1 where the modifier has an initial boiling point greater than 300° C.

20. The composition of claim 1 wherein the modifier has a viscosity index of 130 or more.

21. The composition of claim 1 wherein the modifier has a viscosity index of 150 or more.

22. The composition of claim 1 wherein the modifier has a viscosity index of 200 or more.

23. The composition of claim 1 where the modifier comprises 0.1 weight % or less of functional groups selected from hydroxide, aryls, substituted aryls, halogens, alkoxys, carboxylates, esters, acrylates, oxygen, nitrogen, and carboxyl, based upon the weight of the modifier.

24. The composition of claim 1 where the number of carbons of the modifier involved in olefinic bonds is less than 10% of the total number of carbon atoms in the modifier.

25. The composition of claim 1 where the number of carbons of the modifier involved in olefinic bonds is less than 5% of the total number of carbon atoms in the modifier.

26. The composition of claim 1 where the modifier has a glass transition temperature ($T_g$) that cannot be determined or if it can be determined then the $T_g$ is less than −40° C.

27. The composition of claim 1, where the modifier has an initial boiling point greater than 350° C.

28. The composition of claim 1 where the modifier has a pour point of −20° C. or less.

29. The composition of claim 1 where the modifier has a specific gravity (15.6° C./15.6° C.) from 0.81 to 0.86.

30. The composition of claim 1 where the modifier has a specific gravity (15.6° C./15.6° C.) less than 0.85 and a kinematic viscosity at 100° C. of 3 cSt to 300 cSt.

31. The composition of claim 1 where the modifier has a specific gravity (15.6° C./15.6° C.) less than 0.86 and a kinematic viscosity at 100° C. of 5 cSt to 3000 cSt.

32. The composition of claim 1 where the modifier has a specific gravity (15.6° C./15.6° C.) less than 0.87 and a kinematic viscosity at 100° C. of 10 cSt to 3000 cSt.

33. The composition of claim 1 where the modifier has a specific gravity (15.6° C./15.6° C.) less than 0.88 and a kinematic viscosity at 100° C. of 15 cSt to 3000 cSt.

34. The composition of claim 1 where the modifier has a final boiling point of greater than 400° C.

35. The composition of claim 1 where the modifier has a number average molecular weight between 5,000 and 500 g/mole.

36. The composition of claim 1 where the modifier has a flash point of 250° C. or greater.

37. The composition of claim 1 where the modifier has a dielectric constant at 20° C. of less than 2.3.

38. The composition of claim 1 where the modifier has a carbon number of from 20 to 500.

39. The composition of claim 1 where the modifier has a carbon number of from 30 to 400.

40. The composition of claim 1 where the modifier has a carbon number of from 40 to 200.

41. The composition of claim 1 where the modifier has an APHA color of 100 or less.

42. The composition of claim 1 where the weight loss (in excess of that measured for the base polyethylene) is less than 3% for a 0.25 mm thick sheet that has been stored in a dry 70° C. oven for 300 hours.

43. The composition of claim 1 where the ethylene polymer comprises homopolyethylene.

44. The composition of claim 1 where the ethylene polymer comprises a copolymer of ethylene and one or more $C_3$ to $C_{20}$ alphaolefins.

45. The composition of claim 1 where the polyethylene has an $M_w$ of 20,000 to 1,000,000 g/mole.

46. The composition of claim 1 where the polyethylene has an $M_w/M_n$ of 1.6 to 30.

47. The composition of claim 1 where the ethylene polymer has a melting point (second melt) of 30 to 145° C.

48. The composition of claim 1 where the ethylene polymer has a crystallinity of 2 to 80%.

49. The composition of claim 1 where the ethylene polymer has a heat of fusion between 10 to 230 J/g.

50. The composition of claim 1 where the ethylene polymer has a 1% secant flexural modulus of from 5 to 1000 MPa.

51. The composition of claim 1 where the ethylene polymer has a melt index from 0.02 to 500 dg/min.

52. The composition of claim 1 where the ethylene polymer comprises a copolymer of ethylene and from 0.5 to 30 weight % of one or more comonomers selected from the group consisting of propylene, butene, pentene, hexene, heptene, octene, nonene, decene, dodecene, 4-methyl-pentene-1, 3-methyl pentene-1, 5-ethyl-1-nonene, and 3,5,5-trimethyl-hexene-1.

53. The composition of claim 1 where the ethylene polymer is present at 50 to 99.9 weight %, based upon the weight of the ethylene polymer and the modifier.

54. The composition of claim 1 where modifier is present at 0.5 to 50 weight %, based upon the weight of the ethylene polymer and the modifier.

55. The composition of claim 1 where modifier is present at 1 to 20 weight %, based upon the weight of the ethylene polymer and the modifier.

56. The composition of claim 1 wherein polyethylene or polypropylene having a weight average molecular weight of from 500 to 10,000 g/mole is substantially absent and or wherein phthalates, adipates, trimellitate esters, and polyesters are substantially absent.

57. The composition of claim 1 where the composition further comprises an elastomer.

58. The composition of claim 1 wherein the ethylene polymer has a density of 0.85 to 0.97 g/cm$^3$.

59. The composition of claim 1 wherein the ethylene polymer has a density of 0.86 to 0.91 g/cm$^3$.

60. The composition of claim 1 wherein the ethylene polymer has a density of 0.91 to 0.94 g/cm$^3$.

61. The composition of claim 1 wherein the ethylene polymer has a density of 0.94 to 0.965 g/cm$^3$.

62. An article of manufacture comprising the composition of claim 1.

63. The article of manufacture of claim 62 where the article is selected from the group consisting of: cookware, storage ware, furniture, automotive components, boat components, toys, sportswear, medical devices, medical devices, sterilization containers, nonwoven fibers, nonwoven fabrics, drapes, gowns, filters, hygiene products, diapers, films, oriented films, sheets, tubes, pipes, films, sheets, fibers, woven fabrics, tubes, pipes, sporting equipment, tubing, pipes, wire jacketing, cable jacketing, agricultural films, geomembranes, bumpers, grills, trim parts, dashboards, instrument panels, exterior door components, hood components, spoiler, wind screen, hub caps, mirror housing, body panel, protective side molding, crates, containers, packaging, labware, office floor mats, instrumentation sample holders, sample windows; liquid storage containers, bags, pouches, bottles for storage and IV infusion of blood or solutions; packaging material for any medical device or drugs including unit-dose, blister pack, bubble pack, adhesives, shoe soles, gaskets, bellows, elastic fibers, and sealants.

64. A method to make an article of manufacture comprising subjecting the composition of claim 1 to one or more of: injection molding, compression molding, transfer molding, casting, extruding, thermoforming, blow molding, spunbonding, meltblowing, laminating, pultrusion, fiber spinning, draw reduction, rotational molding, spinbonding, melt spinning, melt blowing; or combinations thereof.

65. A film comprising the composition of claim 1.

66. A method to make a polyethylene composition comprising polymerizing ethylene in a solution process and introducing at least 0.1 wt % of a liquid modifier comprising $C_{20}$ to $C_{1500}$ paraffins that is soluble in the solvent medium into the polymer solution prior to removing the solvent, where the liquid modifier has:

1) a viscosity index of 120 or more, and 2) an kinematic viscosity of 3 to 3000 cSt at 100° C., and 3) a pour point of −10° C. or less, and 4) a flash point of 200° C. or more, and 5) a glass transition temperature that cannot be determined or if it can be determined is less than less than −10° C., and 6) has no distinct melting point above 0° C.;

and wherein the modifier is a compound comprising carbon and hydrogen that contains less than 5 weight % of functional groups selected from hydroxide, aryls, substituted aryls, halogens, alkoxys, carboxylates, esters, acrylates, oxygen, nitrogen, and carboxyl, based upon the weight of the modifier, and wherein the composition comprises less than 5 weight % propylene polymer.

67. A method to make a polyethylene composition comprising polymerizing the ethylene in a bulk process and introducing at least 0.1 wt % of a liquid modifier that is soluble in the bulk medium into the polymer solution prior to removing the solvent, where the liquid modifier where the modifier has:

1) a viscosity index of 120 or more, and 2) an kinematic viscosity of 3 to 3000 cSt at 100° C., and 3) a pour point of −10° C. or less, and 4) a flash point of 200° C. or more, and 5) a glass transition temperature that cannot be determined or if it can be determined is less than less than −10° C., and 6) has no distinct melting point above 0° C.;

and wherein the modifier is a compound comprising carbon and hydrogen that less than 5 weight % of functional groups selected from hydroxide, aryls, substituted aryls, halogens, alkoxys, carboxylates, esters, acrylates, oxygen, nitrogen, and carboxyl, based upon the weight of the modifier, and wherein the composition comprises less than 5 weight % propylene polymer.

68. The composition of claim 1 where in the 1% secant flexural modulus is reduced by 10% or more while the melting point is lowered by 1° C. or less for every 10 weight % of modifier added, as compared to the exact same composition without the modifier present.

69. The composition of claim 1 wherein the modifier has:

1) kinematic viscosity at 100° C. of 6 cSt to 3000 cSt, and 2) a pour point of −20° C. or less, and 3) a viscosity index of 130 or more, and 4) an APHA color of 80 or less, and 5) a flash point of 240° C. or more, and 6) a specific gravity (15.6° C.) of less than 0.86.

70. The composition of claim 1 wherein the modifier has:

1) kinematic viscosity at 100° C. of 6 cSt to 3000 cSt, and 2) a pour point of −30° C. or less, and 3) a viscosity index of 130 or more, and 4) an APHA color of 20 or less, and 5) a flash point of 250° C. or more, and 6) a specific gravity (15.6° C.) of less than 0.86.

71. The composition of claim 1 wherein the modifier comprises an oligomer or polymer of $C_5$ to $C_{14}$ olefins and has a kinematic viscosity at 100° C. of 6 to 300 cSt; and or a number average molecular weight of 600 to 3000 g/mol.

72. The composition of claim 1 wherein the modifier comprises Fischer Tropsch hydrocarbons and/or waxes, and has a kinematic viscosity at 100° C. of 6 to 200 cSt; and/or a number average molecular weight ($M_n$) of 500 to 2,500 g/mole.

73. The composition of claim 1 wherein the modifier comprises a Group III basestock and has a kinematic viscosity at 100° C. of 4 to 50 cSt; and/or a number average molecular weight ($M_n$) of 400 to 1,000 g/mole.

74. The composition of claim 1 wherein the ethylene polymer has a density of 0.910 to 0.97 g/cm$^3$.

75. The composition of claim 1, wherein the Tan Delta (as measured by DMTA) increases by 0.05 for every 10 weight % of modifier added to the composition, as compared to the same composition without the modifier present.

* * * * *